United States Patent [19]

Levine

[11] Patent Number: 4,551,810
[45] Date of Patent: Nov. 5, 1985

[54] METHOD AND APPARATUS FOR DESIGNING DUCT WORK AND FOR PRODUCING PATTERNS FOR CONDUIT SECTIONS IN THE DESIGNED DUCT WORK

[75] Inventor: Richard W. Levine, Dobbs Ferry, N.Y.

[73] Assignee: Construction Technology, Inc., Elmsford, N.Y.

[21] Appl. No.: 536,648

[22] Filed: Sep. 28, 1983

Related U.S. Application Data

[63] Continuation-in-part of Ser. No. 503,699, Jun. 13, 1983, which is a continuation-in-part of Ser. No. 402,607, Jul. 28, 1982, abandoned.

[51] Int. Cl.$^4$ .............................................. G06F 15/46
[52] U.S. Cl. .................................. 364/475; 364/191; 364/512
[58] Field of Search ................ 364/474, 475, 505, 512, 364/520, 130, 400, 418, 171, 191, 192, 193

[56] References Cited

U.S. PATENT DOCUMENTS

| | | | |
|---|---|---|---|
| 3,477,322 | 11/1969 | Gerber et al. | 83/71 |
| 3,596,068 | 7/1971 | Doyle | 235/150 |
| 3,610,081 | 10/1971 | Gerber | 83/62 |
| 3,761,675 | 9/1973 | Mason et al. | 219/121 |
| 3,843,875 | 10/1974 | Goodstal et al. | 235/151 |
| 3,867,616 | 2/1975 | Korelitz et al. | 364/512 |
| 3,875,389 | 4/1975 | McFadden et al. | 235/151 |
| 3,927,948 | 12/1975 | Cox et al. | 364/512 X |
| 4,152,765 | 5/1979 | Weber | 364/191 X |
| 4,178,820 | 12/1979 | Gerber | 83/13 |
| 4,181,954 | 1/1980 | Rosenthal et al. | 364/512 X |
| 4,327,615 | 5/1982 | Gerber et al. | 83/49 |

Primary Examiner—Joseph Ruggiero
Attorney, Agent, or Firm—Kenyon & Kenyon

[57] ABSTRACT

A method and apparatus for partially automatically designing a conduit network and automatically producing patterns for cutting out the sides of conduit sections from laminar material. The CAD-CAM system eliminates the detailing of fittings and other components of a heating and ventilating system, pattern type and dimensional data being fed directly, i.e., without human intervention, from a memory in a CAD system to a CAM pattern generating and fabricating system. The patterns for the closed sides of the conduit network are developed from mathematical relationships specifying the geometry of basic pattern types. The patterns so developed are computed for optimum positioning with other developed patterns, most preferably with alignment of similarly shaped edges for sheet material optimization, and preferably with adjacent grouping of the patterns for each end product to facilitate location and assembly and, most preferably, in such a manner that each grouping can be severed from the sheet material with a single cut to facilitate use of sheet or coil stock shearing machinery.

23 Claims, 53 Drawing Figures

COMBINATION OF DOUBLES

COMBINATION OF AB WITH SINGLE C & D

THIS RESULTS IN THE SELECTION OF AN OPTIMUM POSITION

METHOD AND APPARATUS FOR DESIGNING DUCT WORK AND FOR PRODUCING PATTERNS FOR CONDUIT SECTIONS IN THE DESIGNED DUCT WORK

FIELD OF THE INVENTION

This application is a continuation-in-part of U.S. application Ser. No. 503,699, filed June 13, 1983, which is a continuation-in-part of U.S. application Ser. No. 402,607, filed July 28, 1982, abandoned.

This invention relates to a method and apparatus for partially automatically designing duct work and for automatically producing patterns for the sides of conduit sections in the designed duct network. The method and apparatus find particular utility in the heating and ventilating industry, i.e., in the design and manufacture of air-conditioning ducting, fresh-air or exhaust air ducting, and in the field of conveying fluidized particulate materials, in which industry and in which field custom patterns are required for fittings or other parts on a job-by-job basis and the production run extends to a single set of patterns or to a relatively small number of sets of specially configured patterns.

Any suitable laminar material may be employed in the practice of the present invention, such as, for example, metal sheeting, such as a galvanized iron sheeting, or iron sheeting which has been otherwise coated to render it resistant to rusting and corrosion. Copper or aluminum sheeting, and other sheet materials, such as fiberglass sheeting and the like have also been found to be particularly suitable.

In the air conditioning and ventilation industries the ducting is designed to the specific dimensions of an architectural structure either under construction, renovation or improvement, and the ducts must be tailored or custom designed for each project, particularly since the ducts generally must occupy the residual space and not encroach on the space required for plumbing and electrical lines.

Compared to other manufacturing requirements of the construction industry, duct fabrication is unique in that it still employs one piece at a time custom pattern development and manually controlled cutout of the development patterns. In the space allocated for installation, such as the hung ceiling space in office buildings, the plumbing, sprinkler systems, steam fittings, electrical conduits and air conditioning ducts must all inter-fit and be coordinated to conjointly occupy the available space.

The plumbing lines, sprinkler lines, and steam lines must be arranged in uninterrupted planes, or otherwise drainage of water therefrom is precluded. The size and location of electrical conduits is mandated by the wiring requirements and the pragmatic prohibition which does not permit it to be bent more than a few times or it becomes impossible to pull the wires through the conduits in the usual manner.

In contrast, air ducting can be arranged to extend about and around the work of others. This inter-fitting of the ducting around the other, generally straight-line, structures can be achieved by raising, lowering, changing the direction of or modifying the cross sectional dimensions of the ducting. There is, therefore, a requirement for three-dimensional customized fittings between straight sections of ducting.

Architects and engineers have taken full advantage of the ability to modify ducting location to maximize usable space. Their designs provide relatively complex spatial allocation for duct work, even though the consequent need for non-standard fittings results in costly customizing of ducts. Economically, it has been determined that it is a far better choice to have ten floors of rentable space in a 100-foot high building by employing intricately arranged ducting, instead of eight floors of space with less complex ducting. The initial relatively high installation cost is greatly compensated for by the resultant gain in rentable space.

This extremely high use of non-standard fittings, which must be produced one piece at a time, has prevented the application of automation techniques from significantly impacting the ducting industry. Generally, the hundreds of unique pieces comprising a duct network must first be illustrated on a construction drawing. Upon coordination of a proposed duct network with plumbing, electrical and piping systems and approved by the architect, the individual duct sections are examined by a highly skilled artisan who determines what components are required to create the three-dimensional duct section from flat sheet stock. Each duct section must be "detailed" for shop fabrication. Such detailing frequently requires a lot of time: it is currently an industry-wide estimating practice to allow an equal amount of time to detail a construction drawing, as it took initially to prepare it. Upon the completion of detailing, the component pieces of each duct section (generally four patterns adapted to interfit) must then be marked out on sheet material. The marking out, in addition to being time consuming and laborious, requires the skill of a sheet metal layout technician for laying out the pattern on sheet material.

By and large, little or no attempt is made to optimize material usage and, in fact, the layout is generally a one piece at a time operation. Little time is spent assessing optimum stock widths, positioning of patterns and minimizing severing lines.

Since the sheet metal layout technician must mark out the outline of the four patterns by hand, these four patterns, together, forming the fitting, significant compromises are made as, for example, in not maximizing material usage.

In the late 1950's, a machine called a Coil Line Duct Maker became available. It permitted automation of the manufacture of standard straight duct sections. This machine, now standard shop equipment for virtually all major duct fabricators, permits mass-production of standard straight duct sections and has become the common manner of manufacture.

This has exacerbated the problem attendant upon the tedious and time consuming steps required for the production of the non-standard fittings which now have become the paramount limiting and cost factor in the production capability of duct work fabricators.

It is commonly known in the industry that each hour's output of shop fabrication supports about two hours of field installation work, i.e., every hour gained in shop productivity generates two hours of new work opportunity in field installation.

It would thus seem obvious that fabricators seek to train and employ more layout technicians, but this has not been possible and there presently exists a worldwide shortage of layout technicians. A 1975 survey of the Northeast United States reported that the then average age of a layout technician was 55 years. Although layout technicians represent only 4 to 5 percent of total industry employees, the shortage of technicians has directly accounted for a reduction in the work opportunity for the entire industry.

Some have suggested means for the possible automation of at least part of the layout technician's function, but none were truly beneficial as none could provide a means to create the initial patterns for the components of the fittings which meets the requirements hereinabove set forth.

For example, the use of an electrically driven and controlled marking table has been proposed in the manufacture of patterns, such a marking table being controlled by a scanning arrangement which enables the scaling up of the sets of patterns from reduced scale drawings of those patterns, such drawings commonly being to quarter scale.

However, this technology has, heretofore, not been employed in the ducting fabrication industry because all the layout technician receives is a rough sketch dimension layout of the particular customized piece required, from which the technician must, on a customized basis, create the patterns on the sheet material.

While, heretofore the automation of the production of patterns for nonstandard duct work fittings has been considered as being totally impractical or impossible, considerable attention has been given in other industries to the production of patterns, particularly in the clothing industry, in which extensive developments have been made in automating the cutting of fabric panels for subsequent assembly into garments.

Typical of such applications are U.S. Pat. Nos. 4,327,615 to Gerber et al, issued May 4, 1982; 4,178,820 to Gerber, issued Dec. 18, 1979; 3,610,081 to Gerber, issued Oct. 5, 1971; and 3,477,322 to Gerber et al, issued Nov. 11, 1969, which teach the use of a computer-controlled cutter which is employed to sever layers of material secured to the bed of a cutting table, the cutter being moved under the control of the computer simultaneously in first and second directions longitudinally and laterally of the table along X and Y axes.

Such an operation, however, still involves the initial drawing of the respective patterns to full or reduced scale by a skilled layout draftsman, who must also maximize utilization of the material, after which the drawing is scanned to convert the information contained thereon into digital signals which are stored and subsequently used to control movement of the cutter. Despite the accuracy with which the drawings are prepared, any errors can appear at the cutting head, and can reappear in amplified form in the event that movement of the cutter is scaled up from reduced scale drawings.

Sophistication of the electronics industries, made possible by the availability of computers, has permitted the elimination of repetitive hand drafting but the original drawings must still be created by hand. Electronic scanning now permits the development of the patterns on a cathode ray tube. The storage, in memory, of those patterns in the form of digital information, can then be subsequently recovered and utilized to control the cutter head. This system has the advantage of permitting corrections to be made of any errors which occur in the developed pattern, but do not solve the problem of creating the initial patterns. This still requires the skill of a technician.

For example, U.S. Pat. No. 3,596,068 to Doyle, issued July 27, 1971, recognizes the disadvantage of manually laying out patterns to maximize material usage and proposes converting manually developed patterns to digital signals and the subsequent comparison of the digitized information, including rotation of the stored pattern information, to optimize material usage. Similarly, U.S. Pat. 3,875,389 to McFadden et al., issued Apr. 1, 1975, discloses a system the object of which is to optimize a single pattern to permit its production in quantity by interfitting facsimiles of that pattern and rotating the assemblage until maximized material usage is achieved. Both of these teachings still require a separate hand drawing for each pattern to be produced as the basis for digitization, comparison and pattern rotation.

Once the patterns have been established and laid out, automated methods for cutting have been suggested. Again, and more particularly as related to the clothing industry, it is recognized in U.S. Pat. No. 3,761,675 to Mason et al, issued Sept. 25, 1973, that the cutting of fabric is feasible using a laser beam as a cutter.

However, these advances found little applicability in the duct work fabricating industry. Creation of the master pattern was still subject to the individual skill of an artisan and, lacking mass production needs, automation was conceived of as being economically impractical.

SUMMARY OF THE INVENTION

According to the present invention, the creation of a duct network such as a heating and ventilating system for a building is automatically implemented from the initial designing stages through the production of the sides of each individual conduit section in the duct network. Operations, heretofore requiring the judgment and skill of the technician, are fully automated, including the initial determination of the number and size of pattern required for each nonstandardized fitting; the placement of the patterns or pattern on the sheet material, both optimizing material usage and cutting patterns; and, in its most preferred form, to scribe or mark out; tag and, if desired, cut out the pattern or patterns for ready assembly.

The dimensions of each conduit section in the duct network are arrived at via a computer assisted design process, the computer automatically determining the pattern type and dimensions of the patterns for the sides of each conduit section. This pattern type and actual dimensional data is stored in digital form in an electronic memory device. Upon approval of the construction plans by the architect, the stored data is automatically used to generate the patterns for the conduit section sides. The automated process and apparatus according to the present invention at least doubles the output of heating and ventilating draftsmen. Because the output of one draftsman will normally support 10 field installers, use of the present invention will enable the average draftsman to support 20 field installers.

According to the present invention, a method for automatically producing patterns for the sides of a three dimensional product which can be fabricated from sheet material, such as a ventilating duct section, comprises the steps of:

storing, in digital form in a memory, configurations and generic dimensional requirements of basic product types from which all possible variations of the three dimensional product can be produced;

feeding, to a computer connected to the memory, input data including product type and dimensions of the product, the entered dimensions corresponding to the generic dimensional requirements, stored in the memory, of the product type desired;

electronically deriving in the computer actual dimensional and pattern type data for each side of the product from the entered product type and dimensions of the product;

storing in the memory the actual dimensional and pattern type data; and producing patterns for the sides of the product in response to the actual dimensional and pattern type data stored in the memory.

According to another feature of the present invention, the step of producing the patterns includes the steps of:

generating, from the actual dimensional and pattern type data, the pattern of each side of the product, each of the patterns being developed from selected basic pattern types in response to the actual dimensional and pattern type data stored in the memory;

positioning the developed patterns in a series of groupings;

determining which of the groupings yields a minimum surface area so as to provide for optimum material usage and generating digital data representing the optimum grouping;

supplying the digital data representing the optimum grouping to an X-Y plotting table, this data being in block format and including digital data representing the starting point for each pattern in X-Y format and sequential digital data in X-Y format representing the contour of each pattern; and plotting the patterns in accordance with the digital data on a sheet of material on said plotting table.

The step of producing the patterns is described in the parents of this application, namely U.S. application Ser. Nos 503,699, filed June 13, 1983 and 402,607, filed July 28, 1982. The present invention is an improvement over the invention disclosed in that application in that, according to the present invention, the pattern type and actual dimensional data of the conduit section sides are stored in digital form upon electronic derivation of the data. The storage enables the automatic generation of architectural or construction drawings for approval of the conduit system prior to the production of the patterns. Upon approval of the designed system, the electronic data is directly used to produce the patterns without the necessity of producing details (detailed drawings) of the sides of the conduits. This elimination of detailing results in increased efficiency in the overall designing and manufacturing process. A designing and manufacturing system in accordance with the present invention effectively permits direct robotic fabrication of the product-side patterns from the construction drawing. The increase in efficiency will reduce costs in the installation of central duct systems, for example, in the air conditioning industry, thereby making centralized air conditioning systems cost competitive at the outset with individual window units. In the long run, a resultant shift toward central conduit systems will reduce energy expenditures.

In preferred embodiments, of the present invention the apparatus and method contemplate means to evaluate, and to optimize usage on the basis of the likely stock sizes available to the fabricator and to automatically suggest the stock which will result in the least waste.

Provision is also made for the automatic comparison of the sizes and positions of selected duct work sections with the coordinates of load bearing members, electrical conduits and plumbing pipes, the locations and configurations of which have been determined prior to the design of the duct network. The designer or draftsperson is automatically informed, preferably via a CRT display screen, of choking or other conflicts due to obstructions in the selected path of the network.

In accordance with further features of the present invention, centering of network branches with respect to room walls is automatically implemented, together with the selection of optimal sheet material gauges, the detection of duplicated conduit sections and the provision of reinforcing members where loading may be particularly severe.

If desired, a method and apparatus according to the present invention can include such additional features as the fabrication of configurations which exceed the maximum width size of the sheet stock by computing combinations of pieces. Further, in accordance with the present invention, printed records for all patterns in inventory for possible recall may be maintained. The present invention is not only capable of designing non-standard fitting patterns but, in addition, includes, within the pattern configuration, modifications which adapt the patterns to the tooling of the fabricator so as to optimize the assembly process.

These benefits and others which will be apparent to one skilled in the art, have been made possible in part by the discovery that all shapes and dimensions of patterns employed in the duct work industry may be expressed in terms of a small number of geometric shapes which may be three but is preferably four, which can be modified on the basis of predetermined equations to the shape and dimension of a component or side of a desired conduit section, the program or algorithm being employable to produce any required permutation or combination of the basic geometric figures. When provided with the type and dimensions of the the desired conduit section, a method and apparatus according to the present invention enables a complete set of patterns to be automatically produced, including sets of patterns for ducts having bends, dual or multiple bends of any required radius and radial extent, including bends which decrease or increase in radial width and with simultaneous increase or decrease in axial width, and any combination of such bends with rectilinear portions of converging or diverging construction, any of such fitting sections terminating in either right or offset ends. The four geometric figures can be expressed as an annular segment of a circle; dual interconnected annular segments of circles taken about centers of generation which are spaced from each other; a rhomboid, and a trapezoid. The latter two configurations, i.e., the rhomboid and the trapezoid, may be expressed as a single shape as each can be developed from the same configuration through modification of dimensions. However, in order to utilize a predetermined set of algorithms, it is desirable to treat the rhomboid and trapezoid separately.

Further, after having been provided with the required dimensions and number of patterns, an algorithm preferably rotates and orients the forms with respect to each other to yield, on the basis of the stock sheet material being employed, a grouping which aligns all patterns required for a fitting such that a single width wide cut of the sheet will yield a sheet with all the required patterns for a single fitting and additionally maximizes the sheet material usage and provides optimization of the cutting steps in severing the patterns from the sheet stock.

Having finalized calculations on the basis of the algorithm and the specific dimensions of the set of patterns to be produced, the entire process of fabrication of the respective patterns can be effected automatically, by computer-generated sets of patterns fed to a computer controlled layout plotting table and, in its most preferred form by providing a laser means for severance of the patterns.

Ancillary to the cutting of the patterns or the marking thereof for subsequent cutting is the capability of producing a complete inventory of the sets of patterns, a cost accounting thereof, and the location thereof within the ducting system with such information being delivered for subsequent use as hard copy by means of a conventional printout device.

While the present invention is able to develop sets of patterns for any desired shape or dimension of conduit based upon these geometrically expressed figures, it should be understood that the number of patterns required to create a three-dimensional rectilinear fitting need not be comprised of four separate patterns. In some instances, the fitting would be comprised of only two patterns each of which is subsequently bent to provide the four sides of the fitting or one of which is subsequently bent to provide three sides of the fitting.

As will be readily understood, proceeding from a planar square, any desired geometric variation therefrom can be obtained by varying the length of one side to zero or by modifying the angle between adjacent sides. Similarly, any combination of curves can be produced by modifying the radius and arcuate extent of an annular segment, and by adding thereto one or more segments of the same or differing dimensions, either in juxtaposition with each other or in juxtaposition with a rectilinear section. All of these variations are within the capability of the present invention, including simultaneous combination of rectilinear and arcuate segments to produce non-arcuate curvilinear segments.

While the sizes and lengths of duct fittings are infinite in number and in variation, in rectangular duct construction there are basically four general types of fittings besides straight conduit sections. There are transition fittings, which are fittings between ducts of differing outer perimeter dimensions; offset fittings, in which ducts of the same perimeter lying along parallel planes are sought to be connected; elbow fittings, which are fittings for right angle turns; and bevel fittings which are fittings for turns other than ninety degrees.

In accordance with the present invention, once the type of conduit section is identified and the dimensional R information corresponding to memorized generic or nominal dimensions provided, the pattern types and actual dimensions of optional construction components in accordance with approved industry standards will be calculated. The algorithms of the present invention mathematically create the shapes for each of the four sides required for the type of conduit section and provide the most efficient method of laying out the requisite patterns. The results may indicate the desirability of a two piece construction, three piece construction or four piece construction.

Irrespective of the complexity of the fitting the shape of the fitting sought to be designed is generated on the basis of one of the mathematically expressed geometric shapes, i.e., an annular segment of a circle, dual interconnected annular segments of circles taken about centers of generation which are spaced from each other; a rhomboid, and a trapezoid.

In the preferred embodiments of the present invention, the pattern types and dimensions of the four sides of a conduit section are established by means of a first computer or microprocessor, at least temporarily stored in a transfer memory and then automatically transmitted to a second computer or microprocessor. Through sequential rotation and positional orientation of the mathematically expressed dimensional representations of the patterns stored in its memory the second computer, which also carries within its memory the basic mathematical geometric configurations, then positions the configurations A, B, C, and D, which represent the four sides of the fitting, with respect to each other on the basis of the following, in which "X" indicates the positioning of the forms in one direction along a first axis and "Y" indicates the positioning of the forms along another axis, the suffix "r" indicates the rotation of the particular form through ninety degrees, the suffix "1" indicating the forms are tried in a single position, and the suffix "1:2" indicating the forms are tried in mirror image and inverted mirror image:

| | |
|---|---|
| Position 1: | X = A1, B1, C1;<br>Y = B1, D1. |
| Position 2: | X = A1, B1, C1r;<br>Y = B1, D1. |
| Position 3: | X = A1, B1, C1;<br>Y = B1, D1r. |
| Position 4: | X = A1, B1, C1r;<br>Y = B1, D1r. |
| Position 5: | X = A1, B1, D1;<br>Y = B1, C1. |
| Position 6: | X = A1, B1, D1r;<br>Y = B1, C1. |
| Position 7: | X = A1, B1, D1;<br>Y = B1, C1r. |
| Position 8: | X = A1, B1, D1r;<br>Y = B1, C1r. |
| Position 9: | X = A1:2, B1:2 + C1:2, D1:2;<br>Y = A1:2, C1:2 + B1:2, D1:2. |
| Position 10: | X = A1, B1 + C1r. D1r;<br>Y = A1, C1r + B1, D1r. |
| Position 11: | X = A1, B1 + C1r, D1;<br>Y = A1, C1r + B1, D1. |
| Position 12: | X = A1, B1 + C1, D1r;<br>Y = A1, C1 + B1, D1r. |
| Position 13: | X = A1, B1 + D1 + C1;<br>Y = A1 + B1, D1, C1. |
| Position 14: | X = A1, B1 + D1 + C1r;<br>Y = A1 + B1, D1, C1r. |
| Position 15: | X = A1, B1 + D1r + C1;<br>Y = A1 + B1, D1r, C1. |
| Position 16: | X = A1:2, B1:2 + D1:2r + C1:2r;<br>Y = A1:2 + B1:2, D1:2r, C1:2r. |
| Position 17: | X = A1, B1, D1 & C1;<br>Y = A1 + B1 + D1, C1. |
| Position 18: | X = A1, B1, D1r & C1;<br>Y = A1 + B1 + D1r, C1. |
| Position 19: | X = A1, B1, D1r + C1r;<br>Y = A1 + B1 + D1r, C1r. |
| Position 20: | X = A1, B1, D1 + C1r;<br>Y = A1 + B1 + D1, C1r. |
| Position 21: | X = A1:2, B1:2, C1:2, D1:2;<br>Y = A1:2 + B1:2 + C1:2 + D1:2. |
| Position 22: | X = A1, B1, C1R, D1;<br>Y = A1 + B1 + C1R + D1. |
| Position 23: | X = A1, B1, C1, D1r;<br>Y = A1 + B1 + C1 + D1r. |
| Position 24: | X = A1, B1, C1r, D1r;<br>Y = A1 + B1 + C1r + D1r. |
| Position 25: | X = B1r + A1r, C1 + D1;<br>Y = B1r, A1r, D1 + C. |
| Position 26: | X = B1r + A1r, C1r + D1;<br>Y = B1r, A1r, D1 + C1r. |
| Position 27: | X = B1r + A1r, C1 + D1r; |

-continued

Position 28: X = B1r, A1r, C1r + D1r;
Y = B1r, A1r, D1r + C1.
Position 29: X = B1r + A1r, D1 + C1;
Y = B1r, A1r, C1 + D1.
Position 30: X = B1r + A1r, D1r, C1;
Y = B1r, A1r, C1 + D1r.
Position 31: X = B1r + A1r, D1 + C1r;
Y = B1r, A1r, C1r + D1.
Position 32: X = B1r + A1r, D1r + C1r;
Y = B1r, A1r, C1r + D1r.
Position 33: X = B1:2r + A1:2r + C1:2, D1:2;
Y = B1:2r, A1:2r, C1:2 + D1:2.
Position 34: X = B1r + A1r + C1r, D1r;
Y = B1r, A1r, C1r + D1r.
Position 35: X = B1r + A1r + C1r, D1;
Y = B1r, A1r, C1r + D1.
Position 36: X = B1r + A1r + C1, D1r;
Y = B1r, A1r, C1 + D1r.
Position 37: X = B1r + A1r + D1 + C1;
Y = B1r, A1r, D1, C1.
Position 38: X = B1r + A1r + D1 + C1r;
Y = B1r, A1r, D1, C1r.
Position 39: X = B1r + A1r + D1r + C1;
Y = B1r, A1r, D1r, C1.
Position 40: X = B1:2r + A1:2r + D1:2r + C1:2r;
Y = B1:2r, A1:2r, D1:2r, C1:2r.
Position 41: X = B1r, D1 + A1r, C1;
Y = B1r, A1r + D1, C1.
Position 42: X = B1r, D1r + A1r, C1;
Y = B1r, A1r + D1r, C1.
Position 43: X = B1:2r, D1:2r + A1:2r, C1:2r;
Y = B1:2r, A1:2r + D1:2r, C1:2r.
Position 44: X = B1r, D1 + A1r, C;
Y = B1r, A1r + D1, C1r.
Position 45: X = B1:2r + I A1:2r, C1:2, D1:2;
Y = B1:2r, A1:2r + C1:2 + D1:2.
Position 46: X = B1r + A1r, C1r, D1;
Y = B1r, A1r + C1r + D1.
Position 47: X = B1r + A1r, C1, D1r;
Y = B1r, A1r + C1 + D1r.
Position 48: X = B1r + A1r, C1r, D1r;
Y = B1r, A1r + C1r + D1r.
Position 49: X = A1r, B1r, C1 + D1;
Y = A1r + B1r, D1 + C1.
Position 50: X = A1r, B1r, C1r + D1;
Y = A1r + B1r, D1 + C1r.
Position 51: X = A1r, B1r, C1 + D1r;
Y = A1r + B1r, D1r + C1.
Position 52: X = A1r, B1r, C1r + D1r;
Y = A1r + B1r, D1r + C1r.
Position 53: X = A1r, B1r, D1 + C1;
Y = A1r + B1r, C1 + D1.
Position 54: X = A1r, B1r, D1r + C1;
Y = A1r + B1r, C1 + D1r.
Position 55: X = A1r, B1r, D1 + C1r;
Y = A1r + B1r, C1r + D1.
Position 56: X = A1r, B1r, D1r + C1r;
Y = A1r + B1r, C1r + D1r.
Position 57: X = A1:2r, B1:2r + C1:2, D1:2;
Y = A1:2r, C1:2 + B1:2r, D1:2.
Position 58: X = A1r, B1r + C1r, D1r;
Y = A1r, C1r + B1r, D1r.
Position 59: X = A1r, B1r + C1r, D1;
Y = A1r, C1r + B1r, D1.
Position 60: X = A1r, B1r + C1, D1r;
Y = A1r, C1 + B1r, D1r.
Position 61: X = A1r, B1r + D1 + C1;
Y = A1r, B1r, D1, C1.
Position 62: X = A1r, B1r + D1 + C1r;
Y = A1r + B1r, D1, C1r.
Position 63: X = A1r, B1r + D1r + C1;
Y = A1r + B1r, D1r, C1.
Position 64: X = A1r, B1r + D1r + C1r;
Y = A1r + B1r, D1r, C1r.
Position 65: X = A1r, B1r, D1 + C1;
Y = A1r + B1r + D1, C1.
Position 66: X = A1r, B1r, D1r + C1;
Y = A1r + B1r + D1r, C1.
Position 67: X = A1:2r, B1:2r, D1:2r, C1:2r;
Y = A1:2r + B1:2r + D1:2r, C1:2r.
Position 68: X = A1r, B1r, D1 + C1r;

Position 69: Y = A1r + B1r + D1, C1r.
X = A1:2r, B1:2r, C1:2, D1:2;
Y = A1:2r + B1:2r + C1:2 + D1:2.
Position 70: X = A1r, B1r, C1r, D1;
Y = A1r + B1r + C1r + D1.
Position 71: X = A1r, B1r, C1, D1r;
Y = A1r + B1r + C1 + D1r.
Position 72: X = A1r, B1r, C1r, D1r;
Y = A1r + B1r + C1r + D1r.
Position 73: X = A1 + B1, C1 + D1;
Y = A1, B1, D1 + C1.
Position 74: X = A1 + B1, C1r + D1;
Y = A1, B1, D1 + C1r.
Position 75: X = A1 + B1, C1 + D1r;
Y = A1, B1, D1r + C1.
Position 76: X = A1, C1r + B1 + D1r;
Y = A1, B1, D1r + C1r.
Position 77: X = A1 + B1, D1 + C1;
Y = A1, B1, C1 + D1.
Position 78: X = A1 + B1, D1r + C1;
Y = A1, B1, C1 + D1r.
Position 79: X = A1 + B1, D1 + C1r;
Y = A1, B1, C1r + D1.
Position 80: X = A1 + B1, D1r + C1r;
Y = A1, B1, C1r + D1r.
Position 81: X = A1:2 + B1:2 + C1:2, D1:2;
Y = A1:2, B1:2, C1:2 + D1:2.
Position 82: X = A1 + B1 + C1r, D1r;
Y = A1, B1, C1r + D1r.
Position 83: X = A1 + B1 + C1r, D1;
Y = A1, B1, C1r + D1.
Position 84: X = A1 + B1 + C1, D1r;
Y = A1, B1, C1 + D1r.
Position 85: X = A1 + B1 + D1 + C1;
Y = A1, B1, D1, C1.
Position 86: X = A1 + B1 + D1 + C1r;
Y = A1, B1, D1, C1r.
Position 87: X = A1 + B1 + D1r + C1;
Y = A1, B1, D1r, C1.
Position 88: X = A1:2 + B1:2 + D1:2r + C1:2r;
Y = A1:2, B1:2, D1:2r, C1:2r.
Position 89: X = A1, D1 + B1, C1;
Y = A1, B1 + D1, C1.
Position 90: X = A1, D1r + D1, C1;
Y = A1, B1 + D1r, C1.
Position 91: X = A1:2, D1:2r + B1:2, C1:2r;
Y = A1:2, B1:2 + D1:2r, C1:2r.
Position 92: X = A1, D1 + B1, C1r;
Y = A1, B1 + D1, C1r.
Position 93: X = A1:2, C1:2, D1:2 + B1:2;
Y = A1:2, B1:2 + C1:2 + D1:2.
Position 94: X = A1, C1r, D1 + B1;
Y = A1, B1 + C1r + D1.
Position 95: X = A1, C1, D1r + B1;
Y = A1, B1 + C1 + D1r.
Position 96: X = A1 + B1, C1r, D1r;
Y = A1, B1 + C1r + D1r.

The symbol "+" above indicates that the forms are tried in more than one row or column in the direction indicated. For example, Position 9 indicates that forms A and B are positioned next to each other in the X direction; Forms C and D are then also positioned next to each other in the X direction. The Y direction indicates that Forms A and C are positioned next to each other in the Y direction and that forms B and D are likewise positioned next to each other in the Y direction. Accordingly, the forms are tried in the arrangement

AC
BD if X indicates the vertical axis and Y indicates the horizontal axis (see Table below). Position 9 also indicates the forms A, B, C and D are arranged in mirror image and inverted mirror image. This method of arranging the forms will become clearer in the more detailed description below with reference to the drawings and the Table.

In addition, the following extra positions permit the mathematical positioning of dimensional representations E, which are larger in at least one dimension than the sheet stock available, so as to require more than a single sheet to produce a side of a particular pattern, on the basis of the following additional positions:

| | |
|---|---|
| Position 97: | X = E1, E1 + C1, D1; |
| | Y = E1, C1 + E1, D1. |
| Position 98: | X = E1, E1 + C1r, D1r; |
| | Y = E1, C1r + E1, D1r. |
| Position 99: | X = E1, E1 + C1, D1r; |
| | Y = E1, C1 + E1, D1r. |
| Position 100: | X = E1, E1 + C1r, D1; |
| | Y = E1, C1r + E1, D1. |
| Position 101: | X = E1:2, E1:2, C1:2, D1:2; |
| | Y = E1:2 + E1:2 + C1:2 + D1:2. |
| Position 102: | X = E1, E1, C1r, D1; |
| | Y = E1 + E1 + C1r + D1. |
| Position 103: | X = E1, E1, C1r, D1r; |
| | Y = E1 + E1 + C1r + D1r. |
| Position 104: | X = E1, E1, C1, D1r; |
| | Y = E1 + E1 + C1 + D1r. |

The above positions represent the essential positional combinations which will yield a group of patterns for a fitting or conduit section which can be severed from a sheet by a single cut across the sheet and in which the patterns are laid out for minimum waste of material and optimum severance.

The second computer performs the mathematical calculations, the computer having stored in its memory the basic geometric configurations and a program for implementing the mathematical positioning.

Preferably, the computer-generated patterns and other data developed and stored in the second computer are converted to a form, such as a paper tape which may be used to actuate automated plotting equipment, which automatically marks out physical representations on planar sheeting by selective traversing of its plotting head along predetermined axes under the control of independently driven motors.

In its most preferred form the method and apparatus of the present invention further includes integral means on the plotting apparatus which is responsive to the information provided by the computer for cutting the patterns by the use of a laser.

The present invention thus describes a method and apparatus for a least partially automatically designing a conduit network and for automatically producing the data required for laminar patterns and the production of the patterns by a mechanically driven plotting apparatus which marks-out or carries along the cutting tools for severance of the patterns on a sheet of material positioned on the plotting bed of the plotting apparatus.

Preferably, the plotting apparatus includes a plotting head supported for independent movement parallel to the plotting bed along preferably mutually perpendicular X and Y axes, the plotting head being driven selectively along the respective X and Y axes by dual independently driven motors under the control of a computer and wherein the computer has stored within its memory at least one basic geometric configuration of at least one of a plurality of laminar patterns of an interrelated series of such patterns. Once the computer is provided with information relative to the required ultimate dimensions of the pattern, it correlates the dimensions of the pattern to the dimensions of other complementary patterns which are required to form a series of interrelated patterns which, when interfit, will create a fitting. Furthermore, through selective rotation and positioning of the series of patterns to orient the dimensional representations of the series of the patterns as stored in the computer, the apparatus determines representations of the series of the patterns which results in the smallest required surface area of at least a portion of a sheet material of stock dimensions, considering the optimum desirable cutting lines between the patterns and the requirement that patterns of a fitting be grouped such that the group can be severed by a single, preferably widthwide cut. The data thus developed and stored in the computer is thereafter used to control the drive motors of the plotter to mark out or sever physical representations of the patterns on the sheet of material.

BRIEF DESCRIPTION OF THE DRAWINGS

The present invention will be described in greater detail in the following detailed description with reference to the drawings, in which:

FIGS. 4-1 through 4-15 are schematic representations of transition, offset, elbow and conduit section or bevel fitting types in accordance with the present invention.

FIGS. 6 through 12 are schematic representations illustrating the method by which the present invention calculates the optimum positioning of patterns to minimize material usage and optimize cutting.

FIG. 13 is a schematic representation of two of the various mathematical positions in which a computer included in the pattern generating and fabricating unit of FIGS. 1-3 tries the patterns to determine optimal positioning for laying out and cutting the patterns.

FIG. 14 illustrates, in perspective view, a typical fitting.

FIG. 15 illustrates the prior art method of ordering and laying out the fitting of FIG. 13.

DETAILED DESCRIPTION OF THE INVENTION

Figure 1:
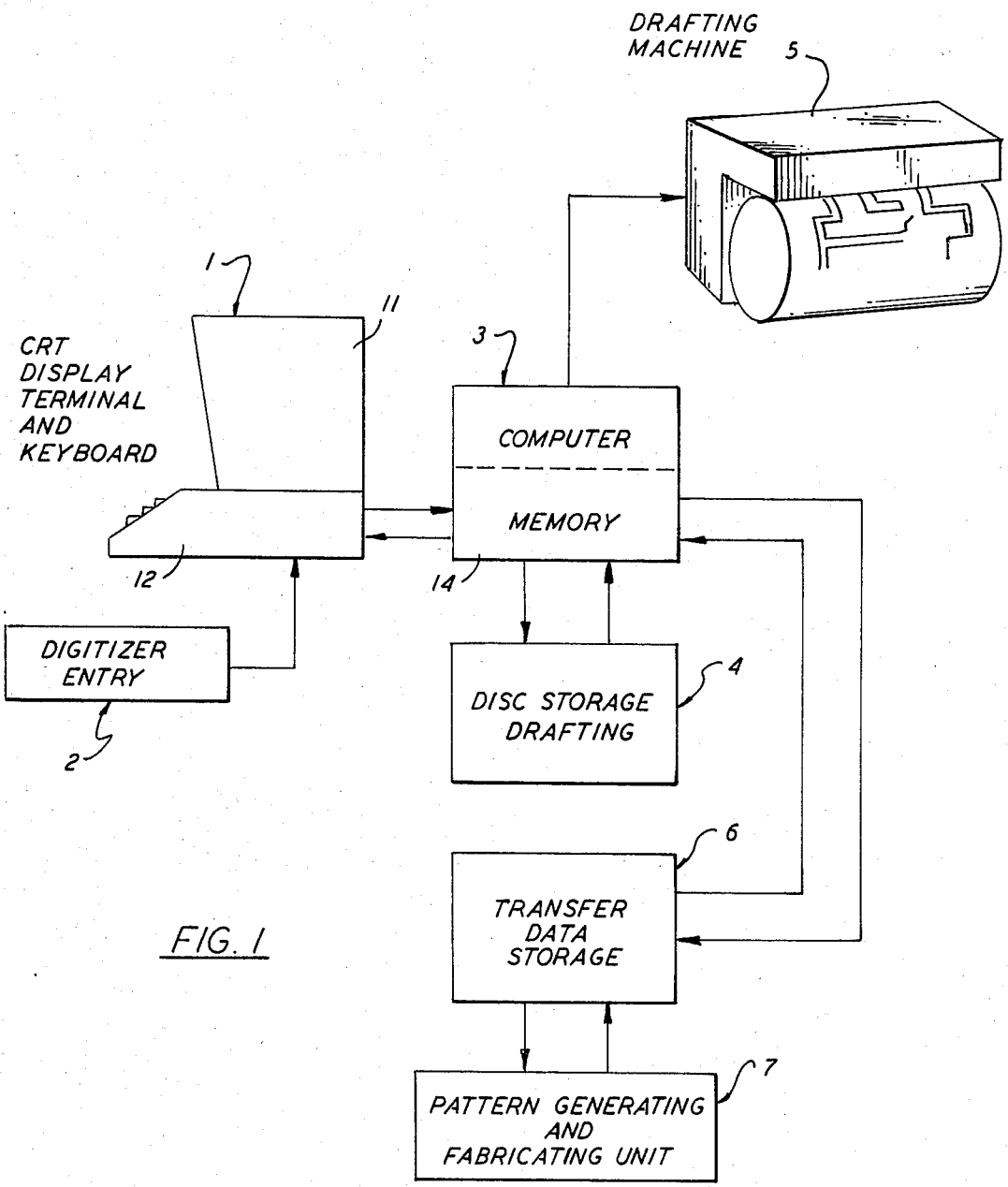
FIG. 1 is a block diagram of an apparatus in accordance with the present invention, for at least partially automatically designing a conduit network and automatically producing patterns for the sides of conduit sections in the designed network.

As illustrated in FIG. 1, a CAD (Computer Aided Design) system for use in the design of conduit networks such as heating and ventilating networks and the production of laminar patterns to be assembled into the designed networks comprises, in accordance with the present invention, a graphic display unit 1 including a CRT display 11 and keyboard-type input 12, the graphic display unit being operatively connected to a computer 3 preferably in the form of a microcomputer or microprocessor and to a digitizer input device 2. Computer 3 is in turn linked to a drafting machine 5 and to a pair of disk type information storage units 4 and 6, storage unit 6 being tied to a CAM (Computer Aided Manufacturing) pattern generating and fabricating unit 7 described in detail hereinafter with reference to FIGS. 2 through 21A and 21B.

Graphic display unit 1, digitizer 2, computer 3, disk storage unit 4, drafting machine 5 and transfer data disk 6 are preferably implemented by the following components:

1—Lexidata Model 2450 graphic display unit;
2—ICS Model SST34, 36"×48";
3—Digital Equipment PDP 11/23, 128K;
4—Digital Equipment Corporation 10M bytes hard disk, 1M bytes flexible disk;
5—plotter, Hewlett Packard Model 7585, size "E"; and
6—Digital Equipment Corporation RL02 floppy, 1M bytes.

As described in detail hereinafter with reference to FIGS. 22 and 23, in response to promptings or requests for specific information displayed on CRT screen 1, a network designer or draftsman enters into computer 3 via keyboard 12 input data as to the section types and dimensions of a conduit section in the duct network under design. Computer 3 then derives actual dimensional and pattern type data for each side of the conduit section and temporarily stores the results in disc storage 4. In response to commands received via keyboard 12, computer 3 controls drafting machine 5 to produce construction or architectural drawings illustrating the patterns defined by the information held in disc storage 4. Upon checking the drawings, the architect and consulting engineers can make changes in the proposed conduit network by loading modification instructions into the designing apparatus.

Changes as required by the architect and consulting engineers can be implemented by:

A. Recall of the drawing data from storage memory for redisplay.

B. "Voiding" or erasing an area from the CRT display screen and drawing by indicating through the use of a joystick control, two opposite corners of the area to be "erased" and issuing an erase command.

C. Reentry of areas either through normal key pad entry or use of a digitizer 2 which is useful in entering data from other drawings into the system.

In accordance with the instructions received, computer 3 modifies pattern type and dimensional information in storage 4 and transfers the updated information to disc storage 6 for later automatic transmission to pattern generating and fabricating unit 7.

Figure 2:
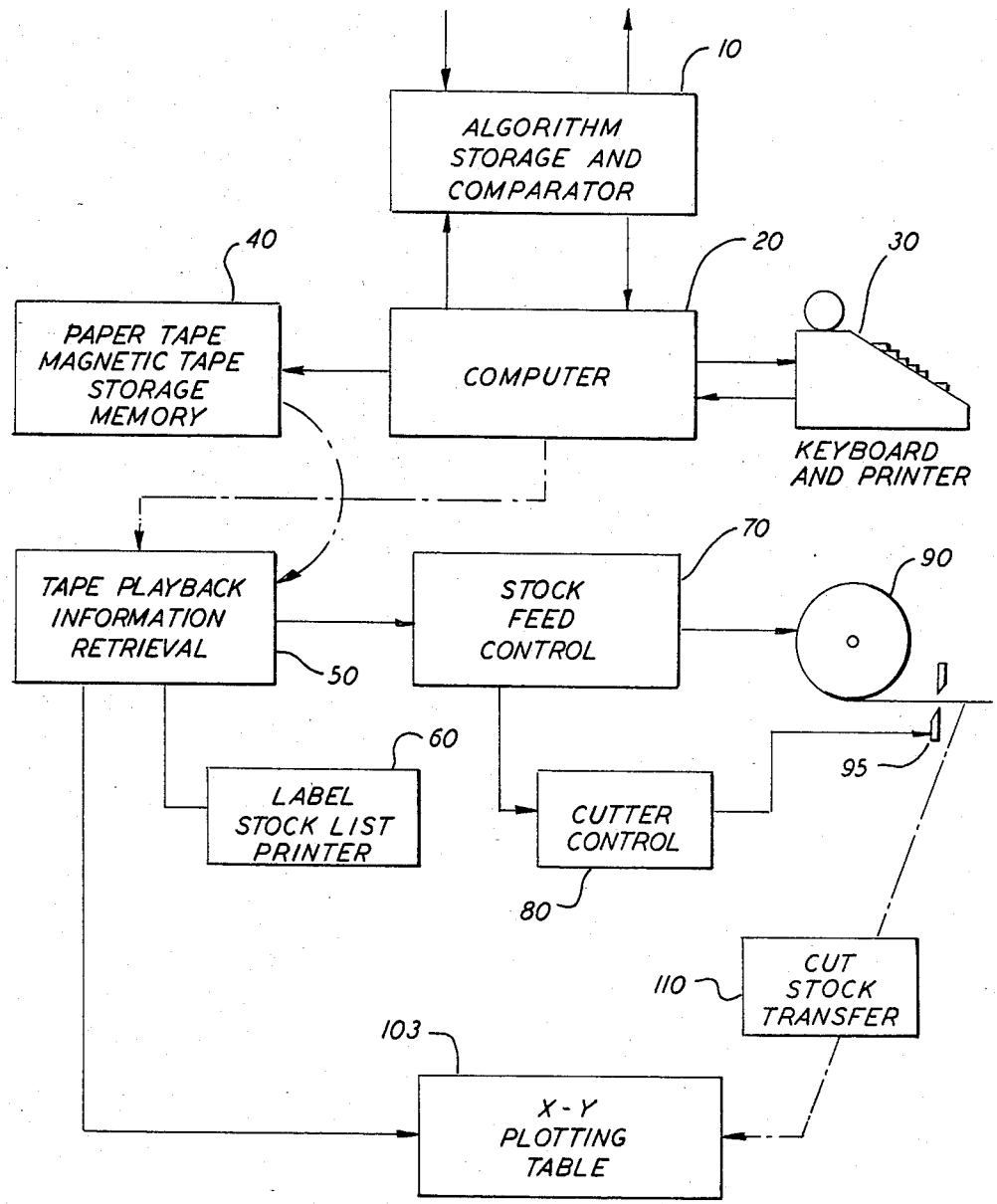
FIG. 2 is a block diagram of a pattern generating and fabricating unit shown in FIG. 1.

FIG. 2 illustrates pattern generating and fabricating unit 7 and shows general means for the retention of information, generation of data, and the production of plotted out patterns on sheet metal stock. The algorithm storage or memory and comparator drive 10 for computer or microprocessor 20 can be selected from any readily available commercial equipment. Preferably a computer system is employed which includes a display, magnetic tape, disk or other storage and a keyboard to permit inputting of information. It is preferable that at least 32K of random access memory capability be included within the system.

Memory 10 stores the preferred program for implementing the optimization listing described above. The preferred optimization program must be stored in a random access computer memory because of the speed with which the optimization must be done. Storage on disks would be too slow to implement the program efficiently. Disk storage, however, might, of course, be used to store the computer operating system program. Should limitations of computer hardware (e.g., insufficient random access memory) preclude the preferred optimization decribed above, other less sophisticated optimization procedures such as the outside rectangle technique to be described later, could be used, with the accompanying reduction in memory requirements. Furthermore, memory 10 should be non-volatile, so that the contents are not lost if the system is powered down. For example, magnetic core storage can be used or a battery backup provided for enabling orderly shut down of the system and storage on permanent media (disk or tape) after a power down.

Computer 20 is coupled to I/O devices 30 which preferably include a keyboard, printer and CRT display. Pattern type and dimensional data previously derived by computer or microprocessor 3 and stored in transfer storage unit 6 (see FIG. 1) are transmitted via storage and comparator unit 10 to computer 20 in response to signals generated thereby. I/O devices 30 enable the feeding of ancillary information and instructions to computer 20. Once the pattern types and dimensional data are inputted into pattern generating and fabricating unit 7 from storage unit 6, the computer 20 will determine which orientation of the duct pattern sides is optimum, preferably in accordance with the optimization program described above, and will output the data which determines orientation of the pattern in X-Y format to an output device 40, such as a paper tape punch or magnetic tape unit. The magnetic tape unit may also be used for backup protection in the event of a power failure.

The paper or magnetic tape bearing the output data can later be read by an appropriate playback and information retrieval device 50, such as a paper-tape reader or magnetic tape unit. Alternatively, data from computer 20 may also be fed electronically to the X-Y plotting table 103 instead of utilizing the intermediate paper or magnetic tape medium. Paper tape, however, provides a convenient means for storing the data indefinitely prior to use on the shop floor. This data controls metal stock feed control 70 and cutter control 80, which controls coil feed 90 and cutter 95, which might comprise a flying shear cutter, for example. The cut sheet metal stock is then transferred, preferably by a conveyor 110, to an X-Y plotting table 103, also controlled by information retrieval device 50. At the X-Y plotting device, the sheet metal stock is either marked with the patterns for a particular duct fitting or the patterns are directly cut, preferably by a laser cutting device, to be described below.

While the data generated by computer 20 could be inputted directly to the plotting table, it is preferable that the data be converted to a storage form such as magnetic tape, paper tape or other memory medium for later use, as described.

Upon the inputting of a command for calling up from storage memory 10 a particular stored fitting layout or any number of layouts up to and including the total number required for a given shipment such as when using tape playback information retrieval equipment, the information can then be provided to the automated plotting table which will plot on X and Y axes as hereinafter more particularly described, the pattern or patterns.

It has been found particularly convenient to employ a paper tape output for computer 20 and a paper tape reader to control the plotting table.

It has also been found particularly desirable, where the fabricator has automated equipment for the feeding of the sheet material, to directly control the sheet metal feed to the plotting table by the computer 20. This permits the feeding out of the sheet material to the plotting table and placing indicia on the sheet for cutting of the sheet into segments after the plotting of the patterns of a particular fitting. While any known means may be employed for feeding the sheet stock, transferring it to the plotting table and cutting it, it is particularly desirable if the equipment includes a tape reader compatible with the tape reader which controls the plotting table.

In its preferred form, the tape playback information retrieval apparatus, preferably, also includes a label stock list printer 60 which prints the labels for each of the patterns and identifies those common to a given fitting. As hereinbefore set forth, the program executed by computer 20 maintains all components of each conduit fitting in adjoining relationship so as to ensure that all patterns of a fitting can preferably be separated from the patterns of other fittings with a straight cut cross the width of the sheet stock. This feature not only provides a benefit in instances where on-site separation of the patterns from the sheet stock and fabrication is desirable but also provides benefits to fabricators who cut out the patterns immediately and assemble the fitting so that they can be delivered to the job site in finished form.

Figure 3:
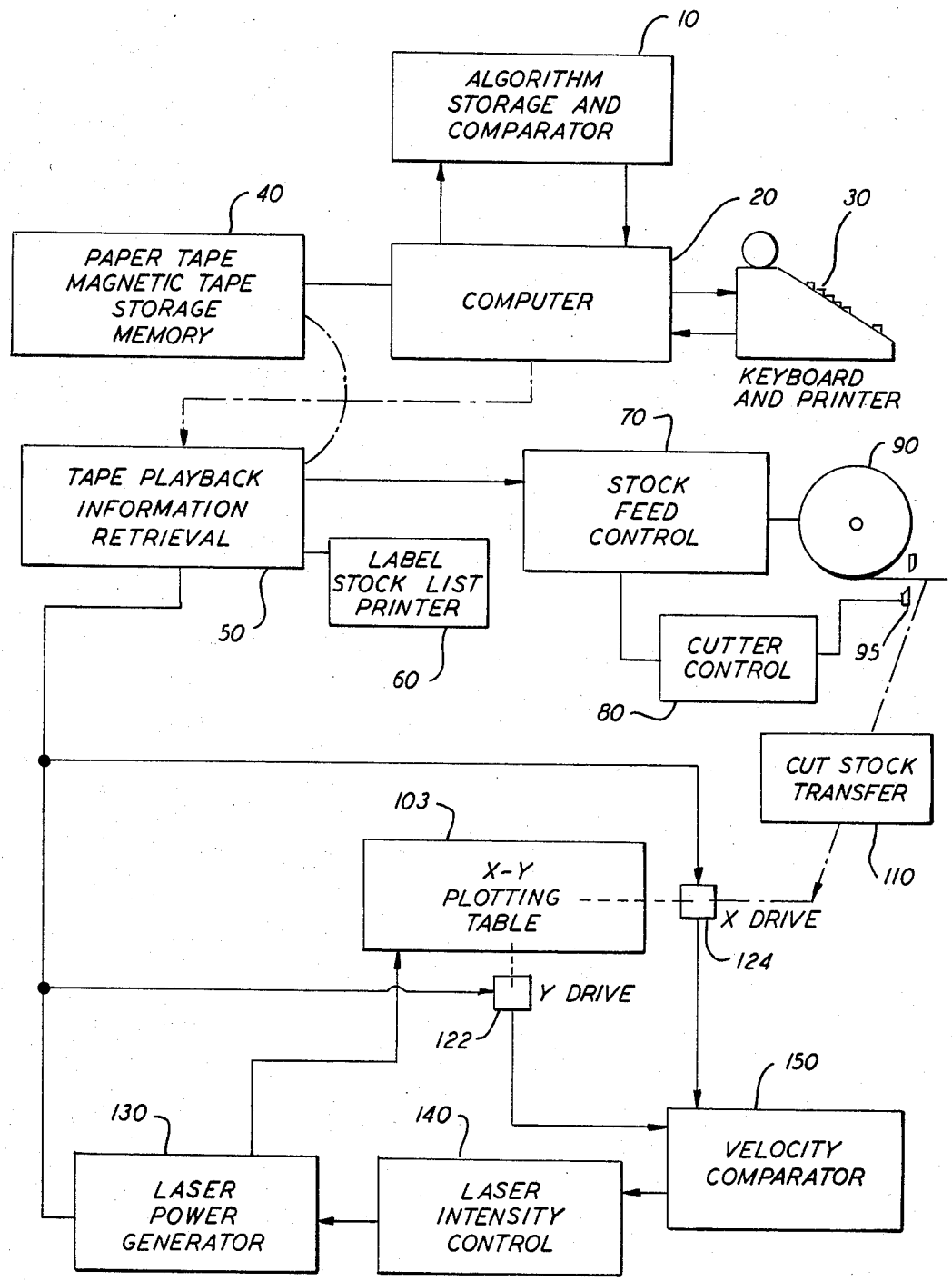
FIG. 3 is a block diagram showing an alternate form of the pattern generating and fabricating unit shown in FIGS. 1 and 2.

FIG. 3 illustrates a preferred form of pattern generating and fabricating unit 7 which further includes automated equipment to cut out the patterns on the plotting table through the use of a laser. Like components are indicated with the same reference numerals as used in FIG. 2. The embodiment shown in FIG. 3 further comprises Y motor drive controller 122, X motor drive controller 124, velocity comparator 150, laser cutter power generator 130 and laser cutter intensity control 140.

Figure 18:
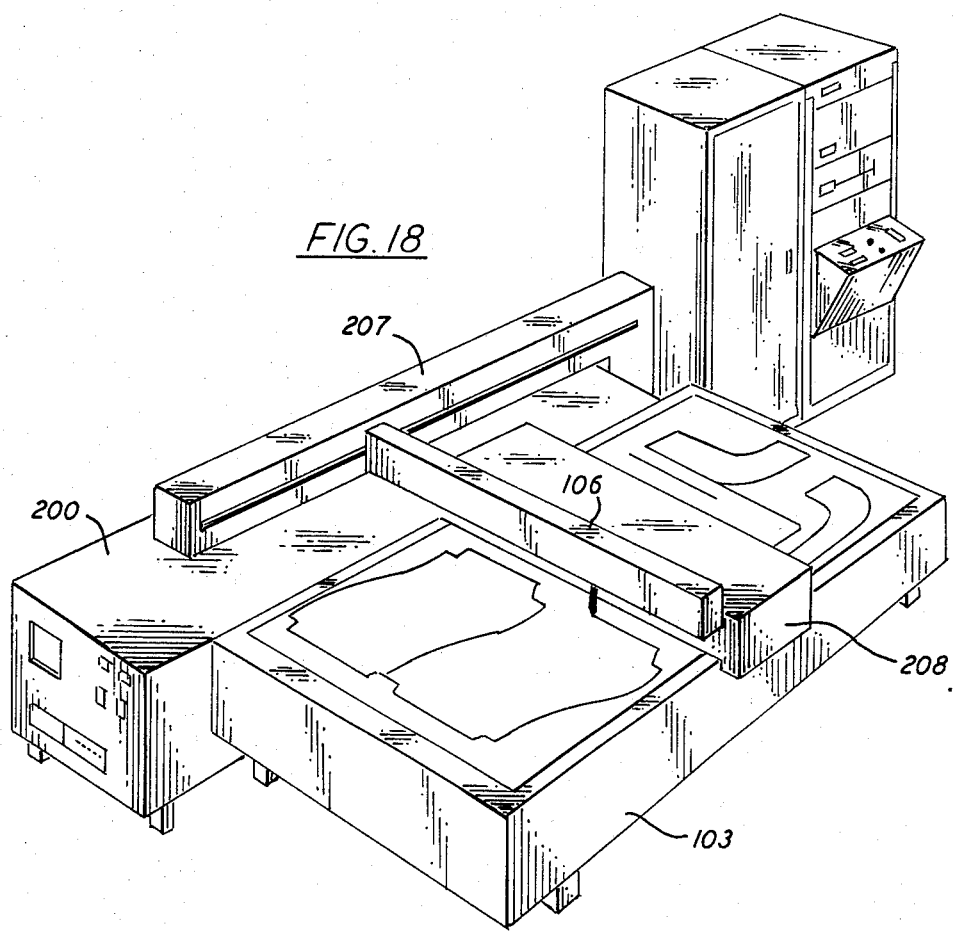
FIG. 18 is a perspective view of the apparatus of the present invention including a laser cutting apparatus.
Figure 19:
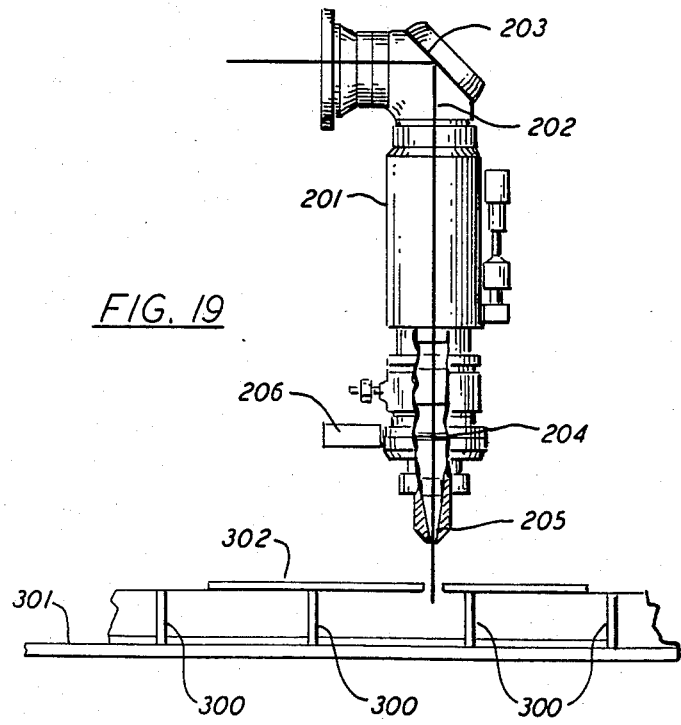
FIG. 19 is a detailed, partially sectional view, of the laser cutting nozzle assembly of the apparatus of FIG. 18.

The method and apparatus for the laser equipment will be set forth in greater detail, particularly with regard to FIGS. 18 & 19. In general, a focused laser beam delivery nozzle is mounted on the carriage of the plotting table which carriage is driven by an X-drive controller 124 in a first direction and a Y-drive controller 122 in a second direction, generally at right angles to each other. The computer 20 generates pulses respectively to the X and Y motors via playback information retrieval device 50 with the pulses supplied to the X motor being sufficient to move the carriage along the table a distance equal to the X component of the desired movement, and the number of pulses supplied to the Y motor sufficient to move the focused laser beam along the carriage a distance equal to the Y component of the desired movement. A velocity comparator 150 regulates the X and Y drive and a laser power control generator 130, which provides a linear power output signal, preferably coupled with a laser intensity control 140, coordinates the intensity of the laser beam with the speed of movement as generated by the X and Y motors. In this manner, the desired laser beam intensity, given the speed of movement of the laser beam relative to the sheet stock, is controlled for proper energy delivery at the cutting point. This is necessary so that the appropriate amount of laser cutting power is supplied to the sheet metal stock depending on the speed of movement of the carriage on which the laser head is mounted.

While the size and lengths of duct fittings are infinite in number and variety, it has been discovered that rectangular duct construction fittings can be reduced to fifteen varieties of the four general construction types as illustrated in FIGS. 4-1 through 4-15.

Figures 1, 4:
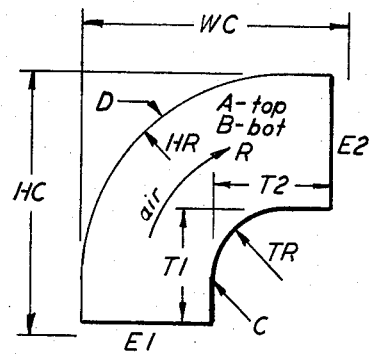
Figures 2, 4:
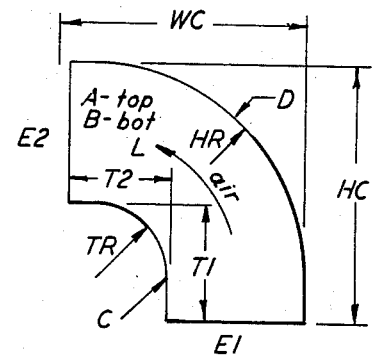
Figures 3, 4:
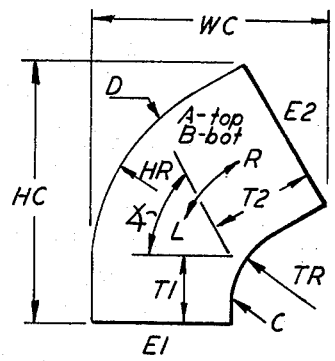
Figure 4:
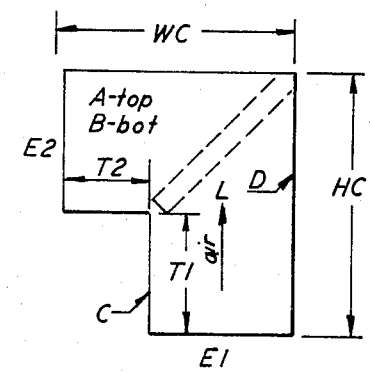
Figures 4, 5:
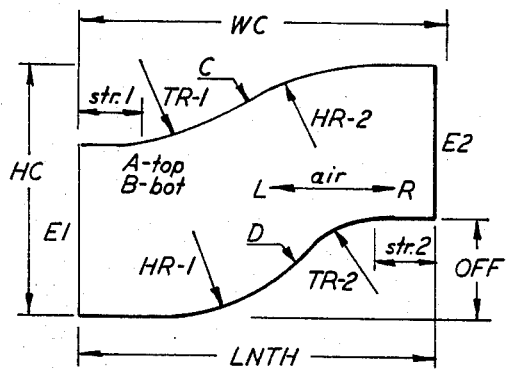

FIGS. 4-1, 4-2 and 4-4 represent the fitting type generally referred to in the industry as an elbow, which is a fitting which turns ninety degrees. FIG. 4-3 represents a fitting which turns other than ninety degrees and is generally referred to in the industry as a bevel.

FIGS. 4-5, 4-6, and 4-7 represent various forms of the fitting type generally referred to in the industry as offset fittings FIGS. 4-8 through 4-15 are generally referred to as transition fittings. They connect ducts of differing perimeter dimensions either in general linear alignment, such as in FIGS. 4-8 through 4-11 and 4-14 through 4-15 or in offset relationship, such as in FIGS. 4-12 and 4-13.

As is noted in FIGS. 4-8 through 4-15, it is possible to fabricate transition fittings either as two-piece constructions as shown in FIG. 4-8, three-piece constructions as shown in FIGS. 4-9 and 4-10 or four-piece constructions as shown in FIGS. 4-11 through 4-15.

Each side of the fitting is identified in FIG. 4 by the letters A, B, C and D. Curvature information, such as a throat radius, is identified as TR and throat length is identified as T1 and T2. End widths are identified as E1 and E2. Width and height are identified by WC and HC, respectively.

In the practice of the present invention, an operator will input information to microcomputer 3 by typing on keyboard 12 (see FIG. 1) an identification as to which type of fitting or conduit section is desired. For example, by typing a "T", a transition fitting is identified or an "O" for an offset fitting, or a "B" for a bevel fitting, or an "E" for an elbow fitting. Computer 3 will then request dimensional information in accordance with generic or nominal dimensions stored in a random access memory 14 of the computer and, based upon the inputted dimensions, the computer will mathematically derive and store the pattern types and actual dimensions of patterns for the sides of the selected fitting, as hereinafter more particularly explained, and then request information regarding the next piece.

In order to complete the pattern production process, the computer 20 (FIGS. 2 and 3) must mathematically create configurations which will, when combined, represent each side of the desired fitting and then compute the position of the patterns with respect to the stock material to result in least waste.

As illustrated in FIGS. 5A–5D all rectangular duct fittings, while varying in size, can be mathematically interpreted as one of three or four shapes. The four shapes indicated are schematic in nature. S1 and S2 in combination with L1 and L2 represent the size and lock allowances for interconnection of the fittings with straight duct work. See also FIG. 14.

By modifying the dimensions A–G in any of the fittings, all required shapes common to rectangular fittings can be described, mathematically optimized and plotted out on a sheet of material.

Figure 5A:
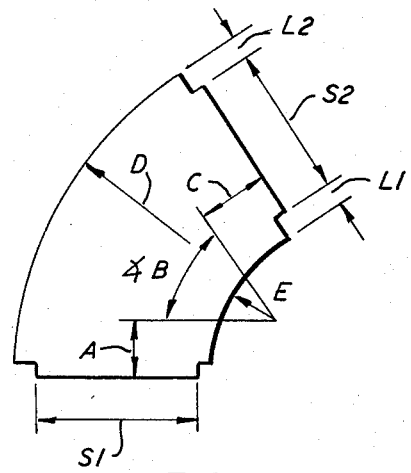
FIGS. 5A through 5D are schematic representations of mathematically generated geometric patterns in accordance with the present invention.

For example, in FIG. 5A modification of the angle B from an acute to an obtuse angle can create a semi-circle. Modifications of dimensions F and G in FIG. 5C can produce a rectangle.

Figure 5B:
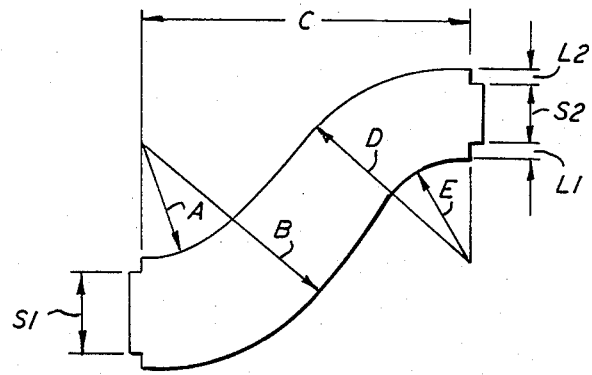
Figure 5C:
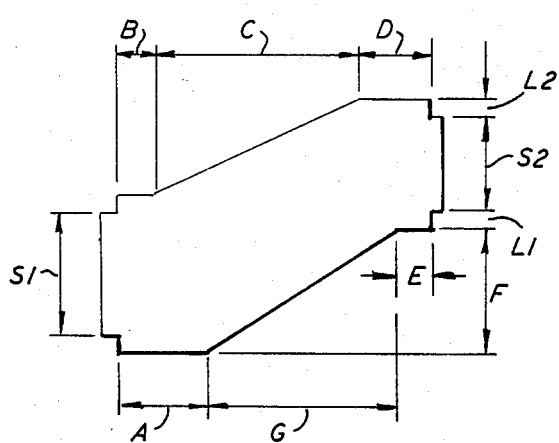
Figure 5D:
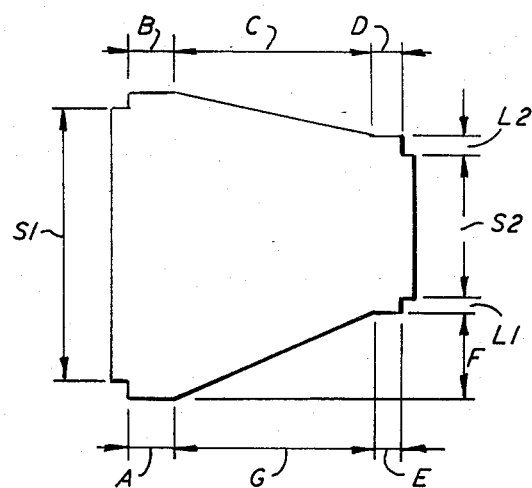
Figure 6:
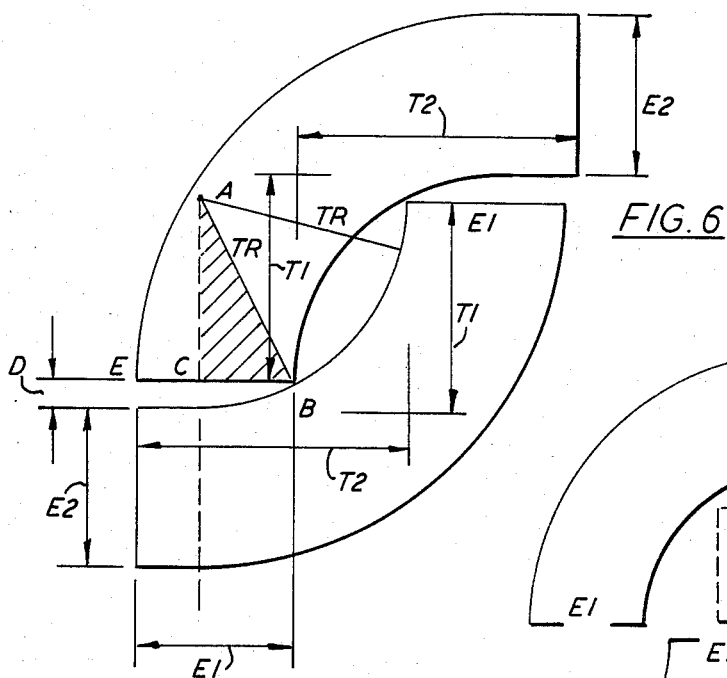
Figure 7:
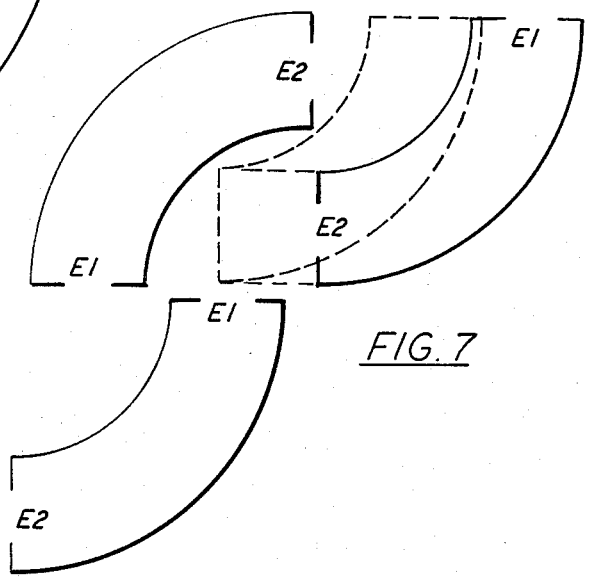
Figure 8:
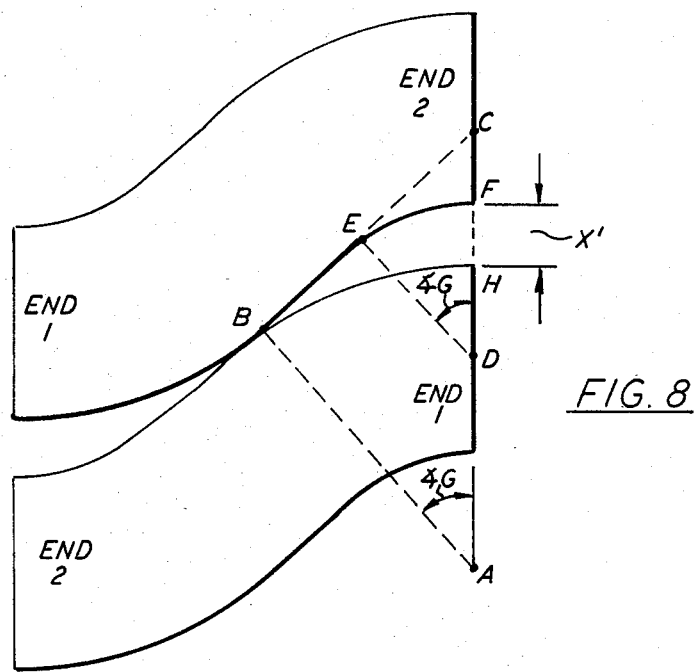
Figure 9:
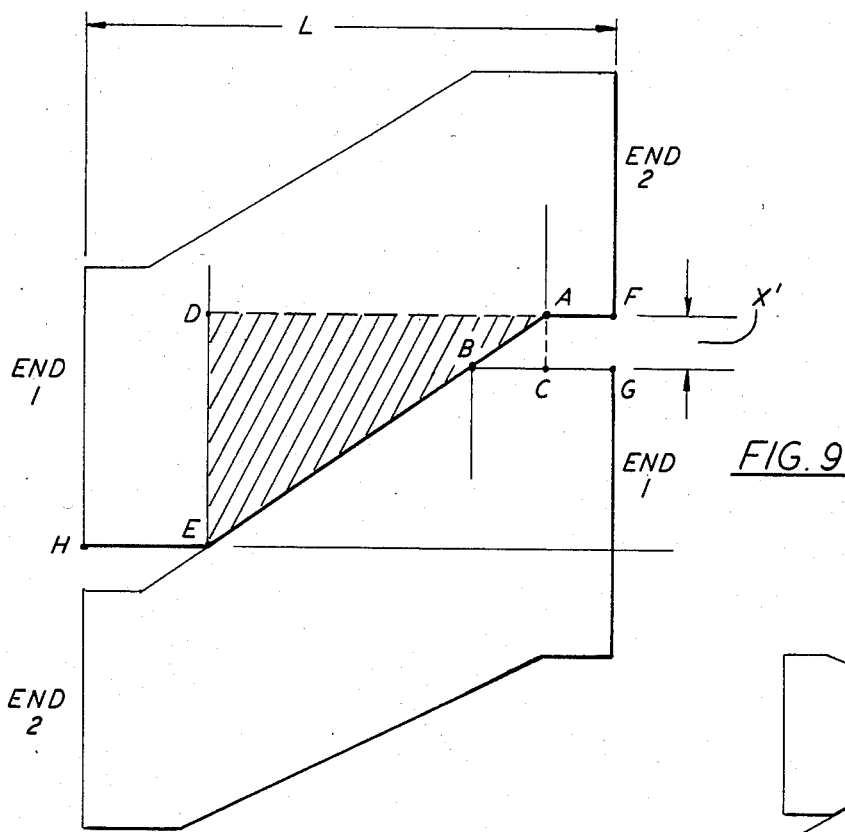
Figure 10:
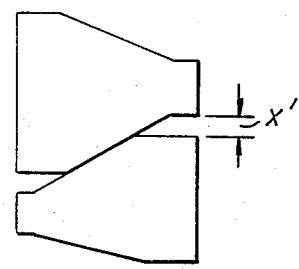
Figure 11:
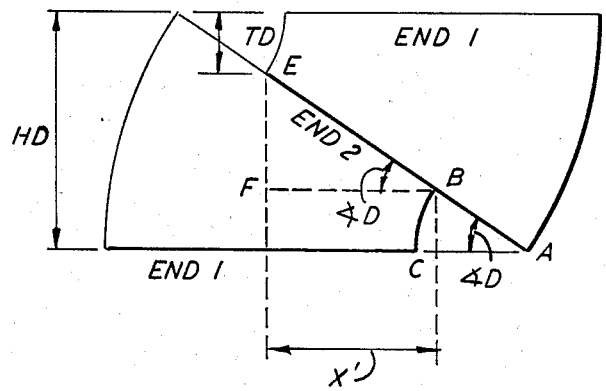
Figure 12:
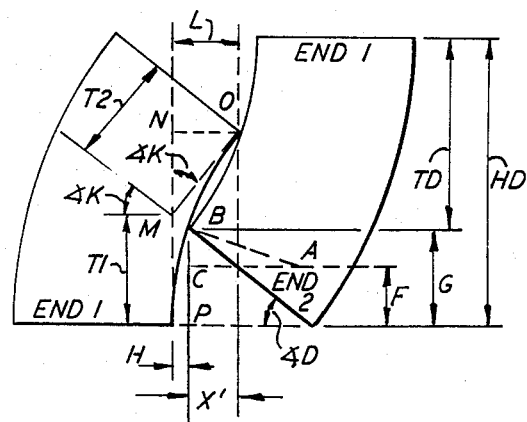
Figure 13:
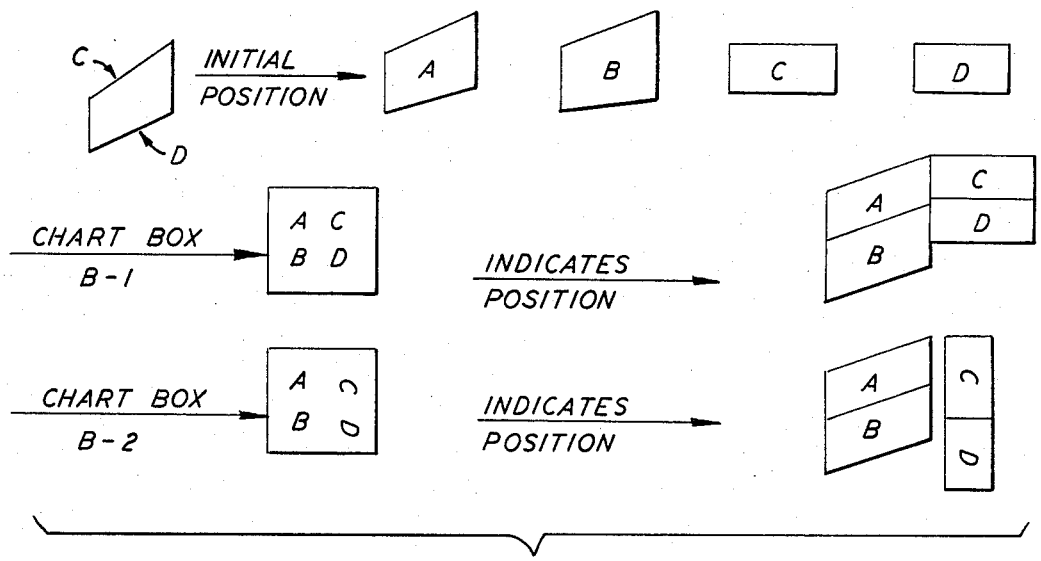
Figure 14:
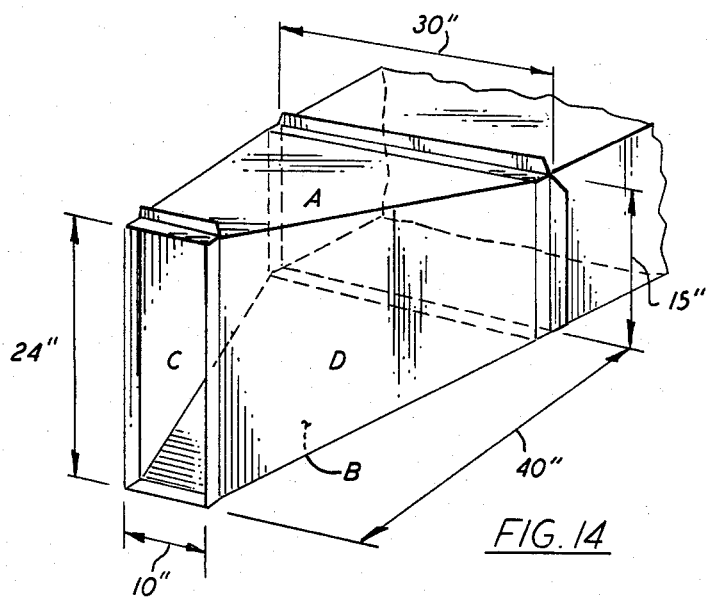
Figure 15:
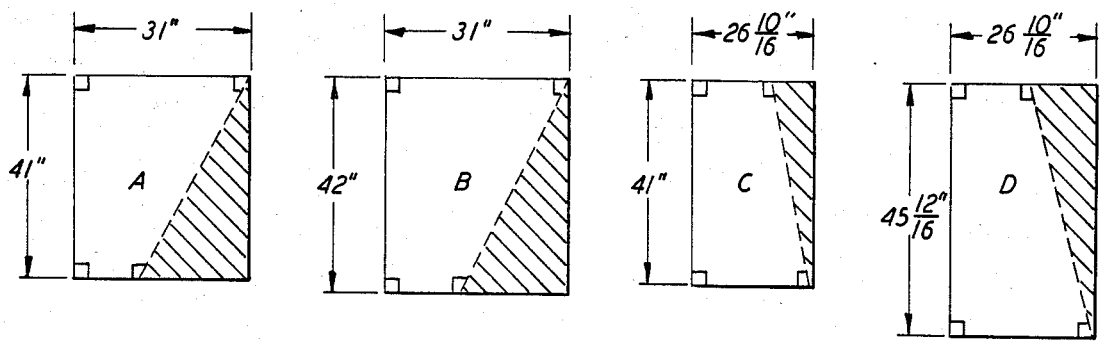

As can be readily appreciated from the foregoing, in rectangular duct work all shapes can be produced on the basis of the four geometric figures illustrated; specifically, an annular segment of a circle as shown in FIG. 5A; dual interconnected annular segments of circles taken about centers of generation which are spaced from each other as shown in FIG. 5B; an approximate rhomboid as shown in FIG. 5C and an approximate trapezoid as shown in FIG. 5D. While it is noted that, as illustrated, FIG. 5C is not a true trapezoid, it should be readily apparent that a trapezoid is easily generated by modification, for example, of the dimensions of F and G.

It should also be noted that variations in the dimensions of FIG. 5C will permit the creation of shapes such as shown in FIG. 5D. However, it has been found that it is preferable to identify shapes in accordance with both FIGS. 5C and 5D as operators are generally those having some training in the duct fabrication industry and are more likely to recognize FIG. 5C as a transition offset combination fitting and FIG. 5D as a reducing transition configuration.

The present invention, further recognizing that opposite sides of rectangular fittings are similar in profile, provides a computer program or algorithm executed by computer 20 for optimizing the interpositioning of patterns relative to each other to create a fitting which can be mathematically expressed on the basis of four equations.

Figures 4, 5, 6:
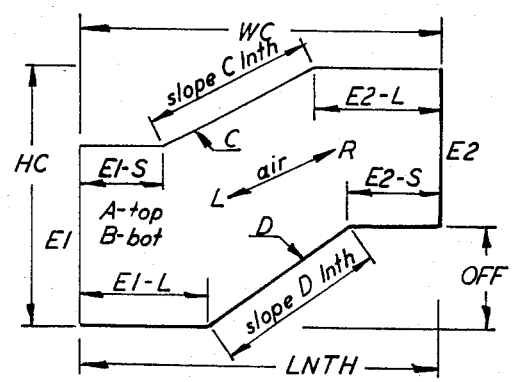
Figures 4, 5, 6, 7:
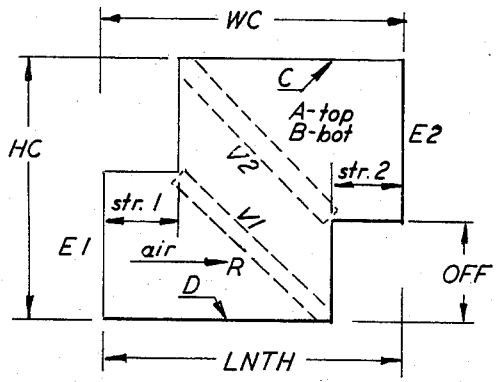

FIGS. 6 and 7 set forth in schematic presentation the positional arrangement of two patterns generated on the basis of FIG. 5A. As illustrated in FIGS. 6 and 7, E1 represents the width of a respective end of each of the patterns, E2 represents the respective width of the other ends; T1 represents a first throat length and T2 represents a second throat length; and TR represents the throat radius size. On the basis of the above information, the optimum distance between patterns, illustrated as X' can be determined as follows:

Line EC = T2 − TR
Line CB = E1 − EC $$\sqrt{TR^2 - CB^2} = CA$$

TR − CA = X'

Accordingly, the computer program stored in memory 10 will position patterns of the type shown in FIG. 6 so that the distance X' equals the specific value determined by the known geometric quantities.

FIG. 6 represents a first mathematical positioning of two patterns and FIG. 7 a second, the positions of FIG. 6 and 7 representing the only two comparisons required as they are the only two possible juxtapositions of curved parts which could yield the most optimized interfittings.

Figures 4, 5, 6, 7, 8:
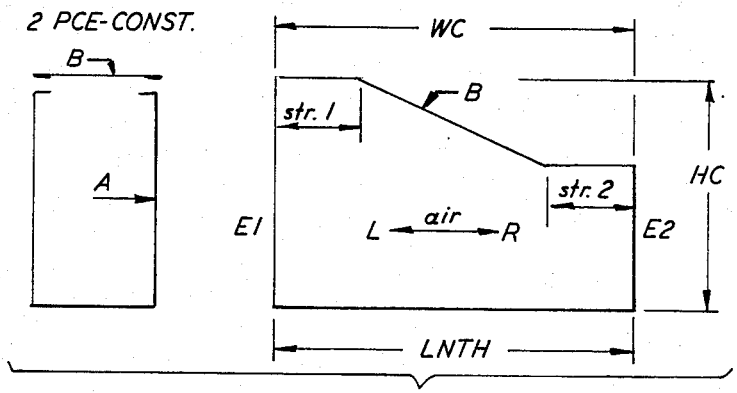

FIG. 8 represents the optimum positioning of patterns geometrically created on the basis of FIG. 5B with X' again representing the optimum distance between patterns. The solution for X' is set forth below.

KNOWN:
BA = HEEL RADIUS
DE = THROAT RADIUS
∢ = G (solved for as being a direct function of the known degree of offset)

$$\text{Cosine} \sphericalangle G = \frac{BA}{CA} \quad \text{Cosine} \sphericalangle G = \frac{ED}{CD}$$

SOLVE FOR CA
$$CA = \frac{BA}{\cos \sphericalangle G}$$

SOLVE FOR CD
$$CD = \frac{ED}{\cos \sphericalangle G}$$

CH = CA − BA (BA = HA)
CF = CD − ED (ED = FD)
CH − CF = X' = OPTIMUM DISTANCE

Again, the patterns are positioned so that the distance X' is uniquely determined by the known geometric quantities.

Figures 4, 5, 6, 7, 8, 9:
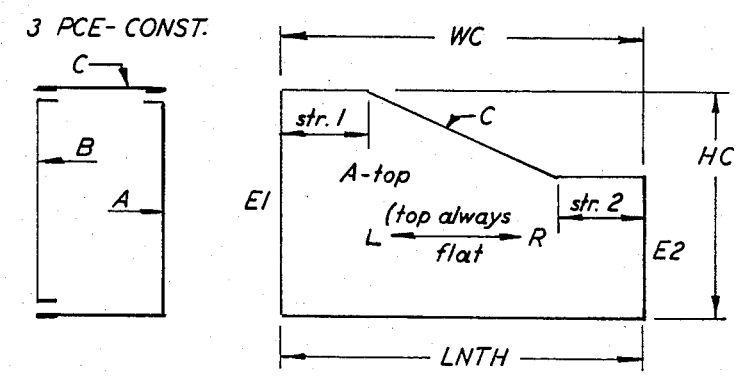
Figures 4, 5, 6, 7, 8, 9, 10:
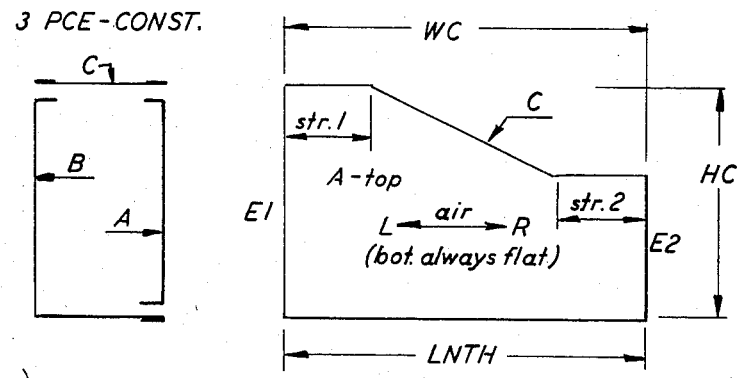

As hereinbefore noted, geometrically both the shapes of FIGS. 5C and 5D are based upon the same mathematical formulation. In a like manner, the optimized positioning of the patterns of each is the same and is illustrated in FIGS. 9 and 10 on the basis of the following:

KNOWN:
AF = STRAIGHT AT END 2
BG = STRAIGHT AT END 1
L = LENGTH OF FITTING
HE = STRAIGHT AT END 1
DE = OFFSET DISTANCE
BC = BG − AF
DA = L − (AF + HE)
Triangle ABC is similar to Triangle EAD $$\frac{DE}{DA} = \frac{X'}{BC} \text{ or } \frac{DE \times BC}{DA} = X'$$

Figures 4, 5, 6, 7, 8, 9, 10, 11:
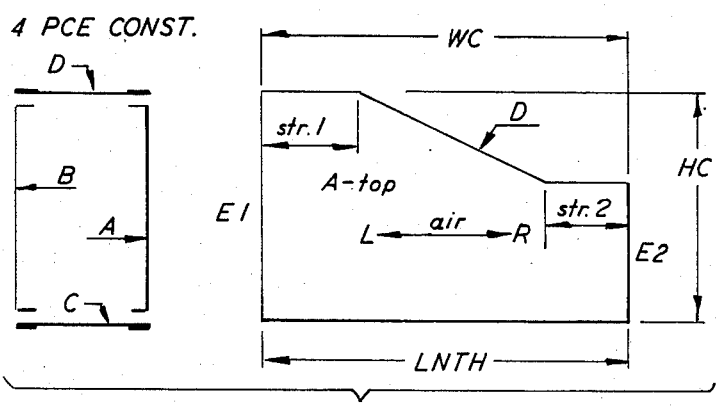
Figures 4, 5, 6, 7, 8, 9, 10, 11, 12:
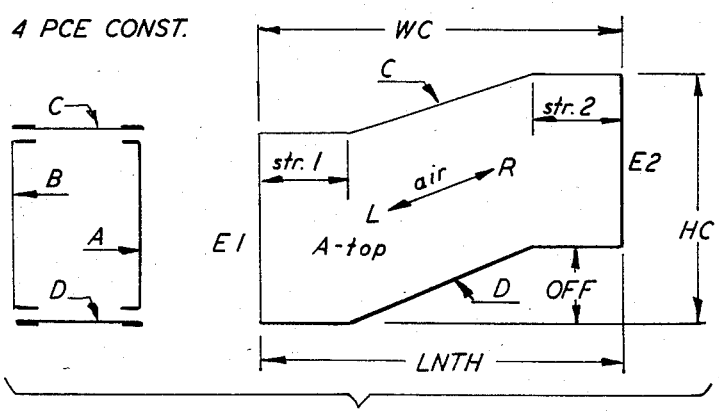

FIGS. 11 and 12 set forth the method of determining optimized positioning of paired patterns of a geometric shape based upon FIG. 5A where the fitting will be a bevel type rather than an elbow type.

It has been discovered that if the throat height TD is less than one half the heel height HD as shown in FIG. 12, the following formula is applicable:

KNOWN:
BA = THROAT RADIUS
D = ANGLE OF BEVEL
EA = WIDTH AT END 2
EB = EA − BA
In Triangle EBF:

$$\text{COSINE} \measuredangle D = \frac{X'}{EB}$$

$$\text{COS} \measuredangle D \times EB = X'$$

If however, throat height TD is greater than half the heel height HD as shown in FIG. 12, the following formula is applicable:

KNOWN:
BD = END 2 WIDTH
BA = THROAT RADIUS
F = STRAIGHT ON FITTING
T1 = THROAT 1 LENGTH
T2 = THROAT 2 LENGTH $$\text{In Triangle DBP, SINE} \measuredangle K = \frac{BP}{BD}$$

$$\text{SINE} \measuredangle K \times BD = BP$$
$$BP = G$$

$$\text{In Triangle ABC, } CA = \sqrt{BA^2 - (G - F)^2}$$

-continued $$BA - CA = H$$

$$\text{In Triangle MNO, SINE} \measuredangle \underline{K} = \frac{\text{NO (or L)}}{\text{MO (or TZ)}}$$

$$\text{SINE} \measuredangle K \times T2 = L$$
$$L - H = X' = \text{OPTIMUM OVERLAP}$$

As hereinbefore noted, it is not merely the interpositioning of parts for optimizing material usage which must be considered but also, a critical factor is the ability to easily and efficiently separate the parts. Ideally, as many common edges as possible which permit a clear cutting path should be employed.

Figures 4, 5, 6, 7, 8, 9, 10, 11, 12, 13:
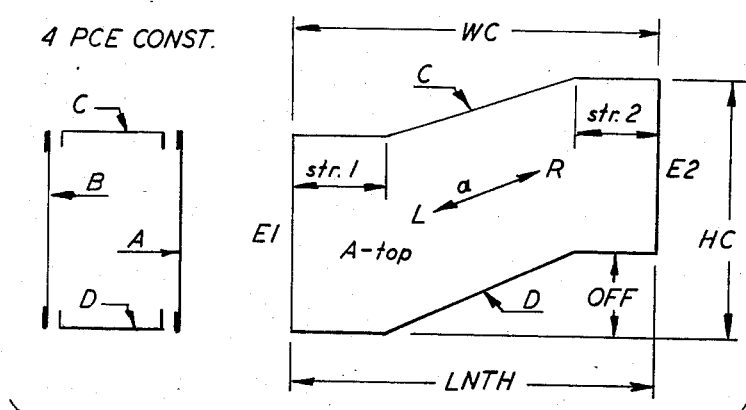

In accordance with the present invention it has been discovered that certain basic positions in combinations will yield a maximized material usage and cutting pattern. FIG. 13 schematically represents a hypothetical problem of positioning four mathematically created pattern shapes A, B, C and D which represent the components of a transition fitting.

Having created the mathematical patterns A, B, C and D, the various orientations of the patterns to each other are compared in accordance with the protocol set forth in the Table below. This Table represents, in graphic form, the information described in the program listing above with respect to the positioning of the patterns for optimizing material usage. For example, Table box A1 corresponds to position 1 above, Table box A8 corresponds to position 8 above, Table box B1 corresponds to position 9 above and Table box B8 corresponds to position 16 above, etc.

TABLE

TABLE-continued

| 1 | 2 | 3 | 4 | 5 | 6 | 7 | 8 |
|---|---|---|---|---|---|---|---|
| B  D | B  D | B  D | B  D | B C D | B D | B D | B C D |

The orientation of the letters A, B, C and D represents the positions being computed. Thus, FIG. 13 illustrates the orientation of Table boxes B1 and B2.

As used in the above Table the numerals 1 or 2 represent an additional position rotation which has been found advantageous for patterns mathematically created on the basis of FIGS. 5C and 5D. The numeral 1 indicates that A and B will also be evaluated both in mirror image and in inverted mirror image. The numeral 2 indicates that C and D will be evaluated in mirror image and inverted mirror image.

The Table, with respect to patterns A, B, C and D, sets forth 96 basic arrangements (rows A–L x columns 1–8), but due to mirror image and reverse mirror image combinations, many more comparisons are made. Further, based upon the fact that certain kinds of construction permit a pairing of identical patterns or at least patterns with a single common edge, a number of comparisons are made as paired comparisons.

Thus, in instances where A and B can be combined and D and C can be combined and, as "doubles", compared one to the other, side to side or top to bottom, or a paired A and B could be combined with an individual C and D either in side by side relationship with respect to A and B generally or parallel to adjacent sides of the combined A and B or along a line beneath A and B, many additional combinations are possible. In all, 192 possible combinations are computed and the optimum position, once located, is selected. It must also be noted that other optimization schemes known in the art may also be utilized instead of the particular preferred optimization scheme described in detail here. Although the invented optimization scheme is particularly efficient, other, simpler techniques which require less computer memory capacity may be used, for example, the "outside rectangle" technique, wherein the rectangle within which each particular pattern fits is compared and optimized with the others. Additionally, once the technique for optimizing is described, such as is shown herein, it will be within the skill of one skilled in the art of computer programming to program a general purpose digital computer of sufficient memory capacity to accomplish the described optimization.

The letter E in the Table indicates an oversized pattern that cannot be rotated on the sheet material as one dimension is longer than the stock width. There are, as illustrated in Table boxes M 1 through M 8, eight additional possible basic positions relative to either an oversized A or B pattern as combined with C and D patterns with mirror images, and therefore eight additional basic positions are compared.

In all, the Table reflects 208 positions which mathematically compare those combinations which will yield the optimized material usage and severance with a minimum of cutting steps for all the patterns of a fitting on a sheet and which preferably lays out such patterns so that the patterns which make up the fitting can be separated as a group of patterns by a single, widthwise cut across the sheet material.

The sequential steps of the above-described selection is illustrated in the flowcharts shown in FIGS. 20A and 20B.

Figure 21A:
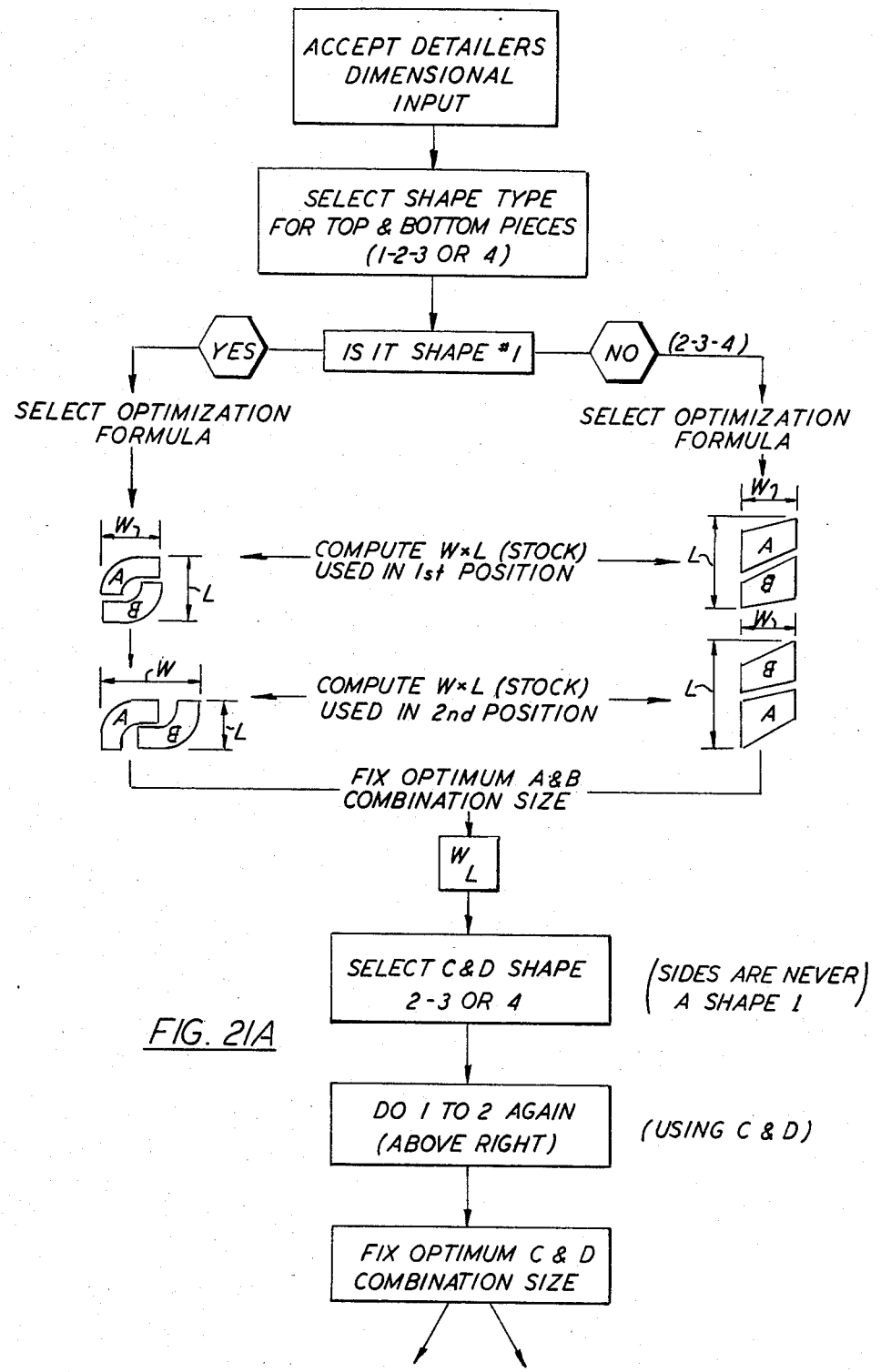
FIGS. 21A & 21B in combined form represent a flowchart of the computer program executed by the microcomputer in the pattern generating and fabricating unit of FIGS. 1–3 and implementing the preferred mathematical optimization in accordance with the present invention.
Figure 21B:
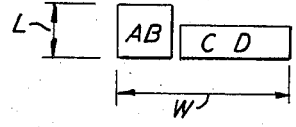
Figure 21B:
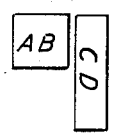
Figure 21B:
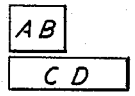
Figure 21B:
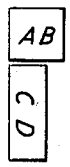
Figure 21B:
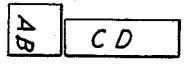
Figure 21B:
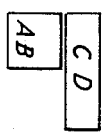
Figure 21B:
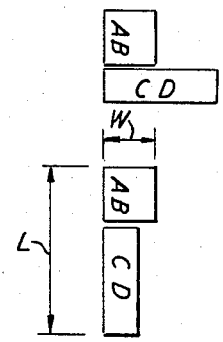
Figure 21B:
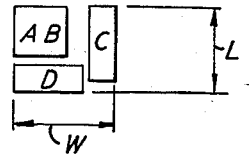
Figure 21B:
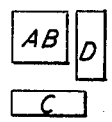
Figure 21B:
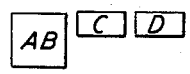
Figure 21B:
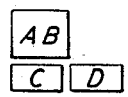
Figure 21B:
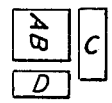
Figure 21B:
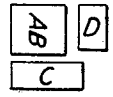
Figure 21B:
Figure 21B:
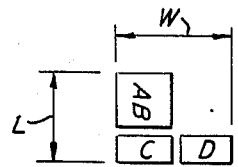

FIGS. 21A and 21B, taken together, are a flowchart of the program stored in memory 10. In response to an instruction inputted via keyboard 30, computer 20 will obtain pattern type and dimensional data concerning the particular fitting from disc storage 6. Computer 20 will then select the appropriate optimization routine based on the fitting type. As shown, if the fitting type is an elbow (shape #1) the program will enter the subroutine shown on the lefthand side of FIG. 21A. If the fitting type is one of the other three types, the program will enter the particular subroutine for that type fitting, as indicated on the right-hand side of FIG. 21A. For the sake of clarity, only the subroutine for one of the other fitting types is shown on the right-hand side of FIG. 21A, although there are other subroutines as discussed above for the remaining fitting types. The program will then cycle through the entire subroutine for the particular fitting type and select the optimum arrangement for the positioning of two patterns of the fitting. At this point, only two sides of the fitting have been optimized in accordance with the mathematical relations described above with respect to FIGS. 6 through 12.

Once the optimum A and B combination has been obtained, the program then selects the remaining sides of the fitting. The remaining sides can never be in the shape of an elbow or bevel fitting if the A and B sides are already configured as elbows or bevel fittings. The program then repeats the subroutines on the right-hand side of FIG. 21A for the remaining sides of the fitting and selects the optimum combination in accordance with the mathematical relations described earlier.

The two combinations thus obtained are then compared as shown in FIG. 21B. FIG. 21B is an abbreviated version of the optimization steps shown in the Table and program listing above. The lefthand side of FIG. 21B shows a number of optimization steps wherein "doubles" or the groupings of two pattern sides are compared to each other. Although only eight comparisons are shown for sake of clarity, the program will cycle through all the steps indicated in the Table or program listing above.

In addition to comparing "doubles", the combination of a "double" with individual ones of the remaining patterns is also tried, as shown by the right-hand side of FIG. 21B. This is also indicated in the above chart by optimization steps D1 through D8, G1 through G8 and J1 through J8.

The reason why this is done is related to the heating and ventilating industry. Of the 4 fitting types described—both the elbow or bevel (FIG. 5A) and the radius offset (FIG. 5B) are such that the remaining two sides will virtually always be rectangles, appropriately bent to shape, and offer little, if any combined optimization.

In the 2 remaining fitting types, offset (FIG. 5C) and converging transition fittings (FIG. 5D), it is common practice to present the fitting in its most dramatically offset or converging view, so that the angular variance (and potential optimization) is normally greatest in the top and bottom pieces. The result of this is that far less optimization saving can be expected in the combining of side pieces as compared to the top and bottom pieces.

Due to the limitations of standard industry stock sizes, it is often impossible to accommodate two "pairs" of combined blanks and it becomes practical to also compare the side pieces individually to the top and bottom combination.

Through this procedure it is insured that the sides (offering less optimization saving) are given priority if separation is required.

Once the optimum stock selection for the particular fitting entered is determined, the resultant "stock length" is evaluated with the previous piece processed to determine if it will also fit on the same stock cut up to the table length maximum, which is normally about 8 to 10 feet long.

Should it be such that the stock for two or more fittings is less than the stock length maximum, it becomes practical to have as many such fittings as possible plotted or cut out of one large length of stock to save cutting and handling time. This is accomplished by adjusting the "starting point" of each plot, to be described later.

If the piece being processed can also fit on the same blank in the X direction or plotting table maximum length, the X dimension of each pattern starting point is increased by the length of the previous piece plotted.

Should two pieces or more be possible to combine across the Y direction (shorter stock width—usually approximately 5 feet), the Y dimension of each starting point is increased by the total Y dimension of the previous piece plotted.

Once the optimum arrangement has been selected, the data is transmitted, either directly or via another medium, such as paper tape, to the plotting table 120.

Figures 4, 5, 6, 7, 8, 9, 10, 11, 12, 13, 14:
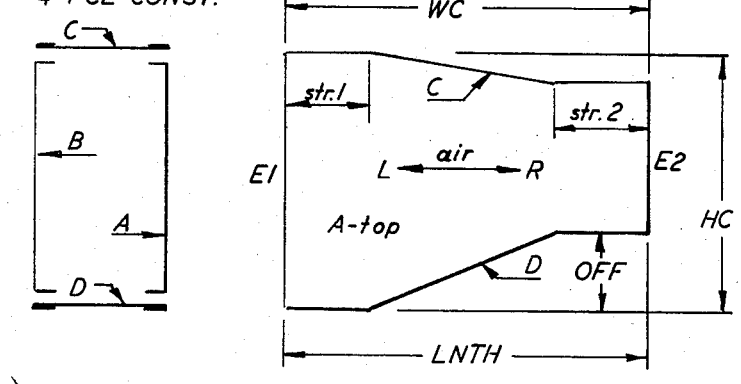
Figures 4, 5, 6, 7, 8, 9, 10, 11, 12, 13, 14, 15:
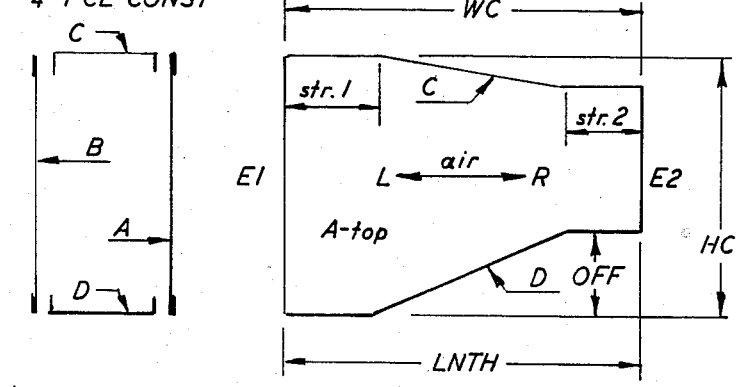

The benefit of the present invention is illustrated using as an example the transition fitting shown in FIG. 14. Prior to the present invention, a technician would be provided with basic dimensional information for each of the four sides of a fitting in a previously designed conduit network. The technician would either hand sketch a drawing or fill in the dimensions on a pre-printed form. The form would then be passed to a skilled technician who, employing mathematics, charts and drafting tools, would compute the exact pattern size for each of the four parts with allowances for a pitch or angle. Assuming the technician selects the correct stock, which, in the example of FIG. 14 is a 48 inch wide sheet, the patterns would have been laid out and cut. The prior art layout is shown in FIG. 15 and assuming appropriate skill by the technician, these patterns could be laid out in approximately 15 minutes and use approximately 38.41 square feet of sheet metal.

In accordance with the present invention, the same information which was handwritten and given for the initial sketch is derived by computer 3 from fitting type and dimensional data fed to the computer by an operator in response to a series of questions which request the data. The operator merely identifies the type of conduit section which in this case is a transition fitting, and the computer requests sequentially the dimensions required to determine the patterns for the side of the fitting. The pattern type and dimensions derived by computer 3 are stored in disc storage unit 4 prior to printing by drafting machine 5 and subsequently transferred to disc storage unit 6 in preparation for loading into computer 20.

Figure 16:
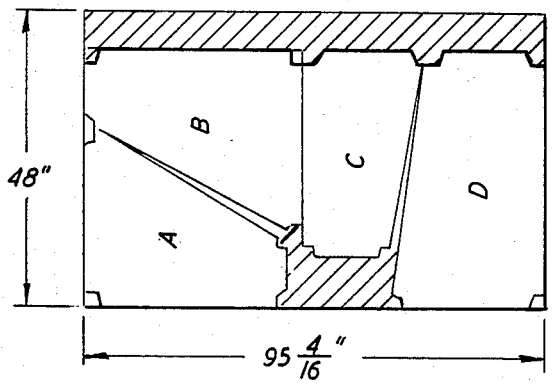
FIG. 16 illustrates the same fitting as illustrated in FIG. 14 as developed and layed out in accordance with the present invention.

Upon transmission of the pattern data to computer 20, the appropriate sheet stock is selected and the entire plotting time is 15 seconds with a material usage of 31.75 square feet. The layout in accordance with the present invention is shown in FIG. 16.

In addition to optimizing the usage of the sheet material, microcomputer 20 is programmed to identify groups of patterns of a common job lot so that a job lot can be identified and an inventory created. It lists the patterns in the order they are to be plotted on the plotting table and, where fabricators have numerical control tape readers at the coil line which feeds out the sheet material, computer 20 can also punch out a tape to directly operate the metal feed onto the plotting surface.

Figure 17:
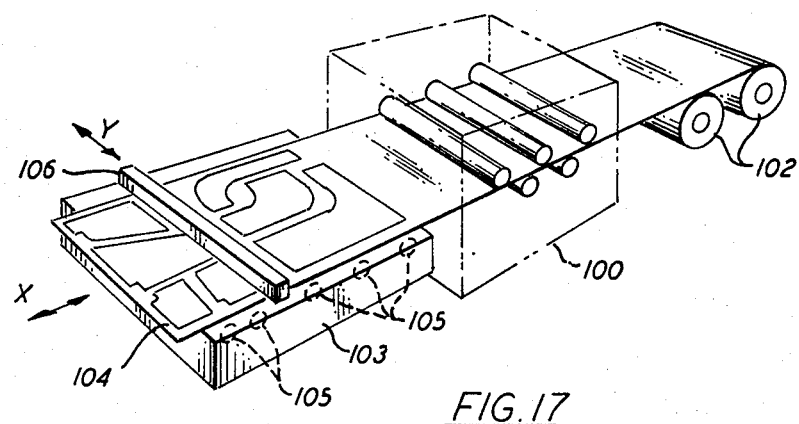
FIG. 17 is a schematic representation of a plotting apparatus in accordance with the prevent invention.

Referring to FIG. 17, there is illustrated schematically, a preferred form of the invention including a coil line feed 100 which feeds coil from the coil line 102 to the plotting table 103. A first length 104 of metal required to form the first fitting is advanced by the coil feed 100 onto the plotting table 103. The plotting table 103 is particularly configured for use with sheet metal. A series of electromagnetic devices 105, preferably a series of fifteen, are built into the surface of the plotting table 103 to securely retain the sheet metal against untoward movement during the plotting step. Where the fabrication material does not lend itself to magnetic securement, such as where the material is aluminum or fiberglass, other securement means such as clamps or vacuum tubes (not shown) may be employed.

The top of the plotting table is preferably made of a material such as stainless steel, which can withstand the weight and wear of sheet metal and preferably is scribed or etched so that it contains indicia conforming to standard widths of stock sheet ordinarily used in the industry. The coil feed mechanism 100, having advanced the length of metal required for the laying out of a first fitting, a plotter, which operates in accordance with the data generated by the microprocessor 20 either directly or through a paper tape input, plots out the patterns required for the fitting.

Preferably an X-Y plotter of the type customarily used for drawing or plotting lines or other information on a sheet of paper or the like is employed, with a pen, scribe or printing mechanism of the type which will write on sheet metal being carried by a carriage 106. The carriage 106 is supported for movement relative to the plotting table 103 in the direction of the X axis and the printing or inscribing mechanism is movable relative to the carriage in the direction of the Y axis.

By moving the carriage 106 relative to the top of the plotting table and by moving the scribe relative to the carriage 106, the patterns can be drawn on the sheet metal.

Once a first set of patterns for a fitting has been laid out, the coil line feed mechanism 100 advances a further length of metal required for a second fitting. Plotting of the second fitting is now accomplished in the same manner as that of the first.

A separating mechanism, often in the form of a flying shear (not shown) separates the first set of patterns which make up the first fitting and the same can be cut and assembled either at the fabricator's plant or on site. The separating mechanism may either precede or follow the plotting table.

For those fabricators who do not have automatic coil line feeding, pre-cut sheets of metal, cut in accordance with the instructions provided by the microprocessor 20, may be placed on the plotting table and laid out in the manner heretofore described.

Figure 20:
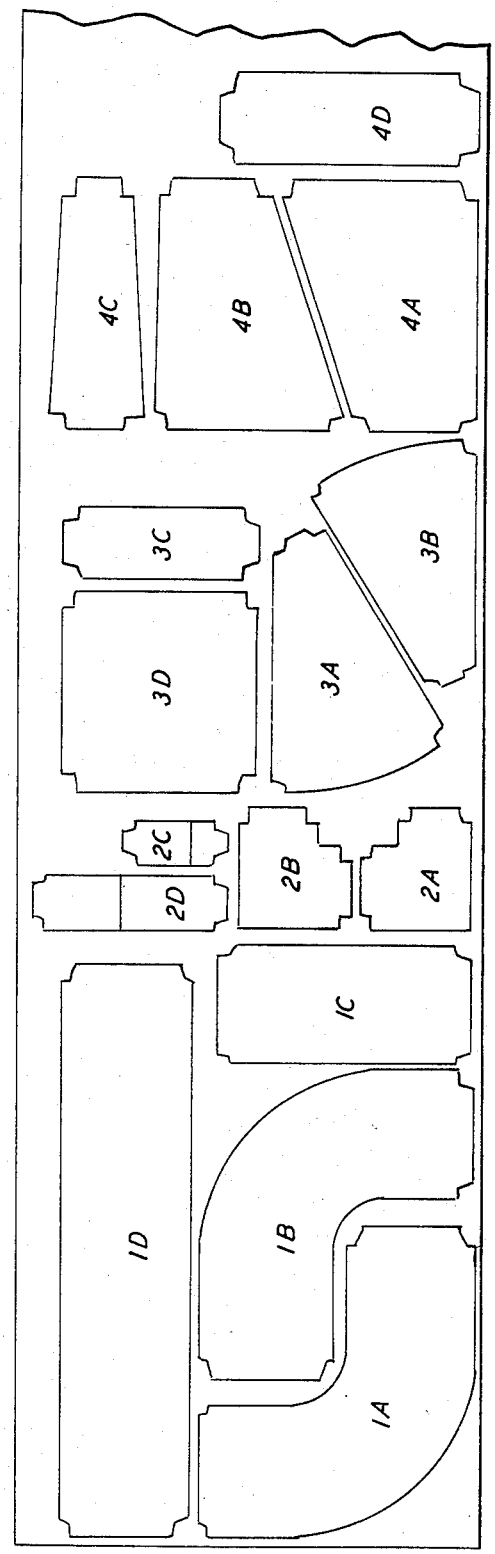
FIG. 20 is a plan view of a typical pattern showing optimization of material and cutting alignment in accordance with the present invention with spaces shown between the patterns for clarity.

FIG. 20 illustrates a typical positioning of patterns on the plotting table in accordance with the present invention. Spaces between patterns are shown for clarity, but as actually laid out, the patterns having common lines touch so that a single cutting severs a side or a portion of the side of two patterns. In FIG. 20, a plurality of groupings of patterns (1A-1D; 2A-2D; 3A-3D and 4A-4D) for four fittings are shown, with a single widthwise severance of the sheet metal possible to effect the severing of a group of patterns which comprise an individual fitting.

The data read from information retrieval device 50 is fed to the X-Y plotting table 103 in sequential form. For each pattern or side of the fitting, a starting reference point is established. All data with respect to the outline of the pattern is based upon this starting point. The data is transferred in block format. A first block includes digital data concerning the location of the reference or starting point for the first pattern to be marked or cut. Once the reference or starting point has been determined, the marking or cutting device moves to this location on the plotting table. The next block of data gives information in digital form concerning the X and Y movement of the plotting head from the starting point. The plotting head moves in small straight line increments, although these increments are too small to result in any noticeable disparity from the desired pattern. Thus, the curved side patterns of an elbow fitting are actually formed by a large series of interconnected line segments. Once one pattern has been marked or cut, the next pattern of the same fitting is marked or cut. Again, a starting or reference point is first obtained and all the remaining points are then plotted.

FIG. 18 illustrates the apparatus of the present invention further including laser cutting means. As illustrated, a laser beam generating apparatus is provided and initiates a laser beam which is operably linked to the arriage 106 through use of mirrors which are preferably water cooled (not shown). As illustrated in FIG. 19, in lieu of a scribing instrument, a laser cutting attachment 201 is affixed to the carriage. The laser beam 202 is directed by mirror 203 through a series of lenses 204 through a nozzle 205 so that a focused laser beam will sever the sheet metal. Preferably the laser is a $CO_2$ laser with the gas inlet illustrated by 206.

The laser beam is shielded by beam covers 207 and 208 with the beam cover 208 carried by the carriage 106.

The energy required for the laser to cut (melt; atomize) must be coordinated with the speed at which the material is being cut. As hereinbefore described, the plotter employs two independently driven motors, one for the X-axis movement and one for the Y-axis movement. The speed of each motor will vary in accordance with the angle or curve of the line being described.

By providing a linear power output signal for the laser which is related to the combined speeds of the X and Y axes motors, the intensity of the laser beam can be modified and, as modified, correlated to the plotting movement of the nozzle of the laser as it traverses the plotting table as carried by the carriage 106.

In order to laser-cut the material on the plotting table a space separation is provided to permit energy focus, and this is illustrated in FIG. 19, where grid separators 300 support and maintain the sheet metal 302 in spaced-apart relationship from the steel table top 301. The space which is so provided allows for sufficient dissipation of the energy of the laser to avoid injury to the top 301 and yet allows sufficient energy to be focused at the sheet metal 302 to permit cutting.

Examples of components which can be used to implement the preferred embodiment of pattern generating and fabricating unit 7 include the following:

10—32K non-volatile RAM or Magnetic Core storage;
20—Digital Equipment Corp. Model 8A400;
30—Digital Equipment Corp. Model LA120 printer/keyboard
40—Digital Equipment Corp. TU - 60 magnetic tape unit and PC-8-E paper tape punch/reader;
50—Gerber 4000 controller with paper tape reader;
60—part of LA120 printer/keyboard;
70, 80, 90, 95 and 110—Coil Line feed controller and cutter (Iowa Precision Instruments);
120—Gerber 77 Plotting Table and Model 4000 controller modified as discussed herein;
122, 124, 130, 140 and 150—Coherent Model 46 $CO_2$ Laser Cutter and Controller modified as discussed herein.

Figures 22, 23, 23A, 23B, 23C:
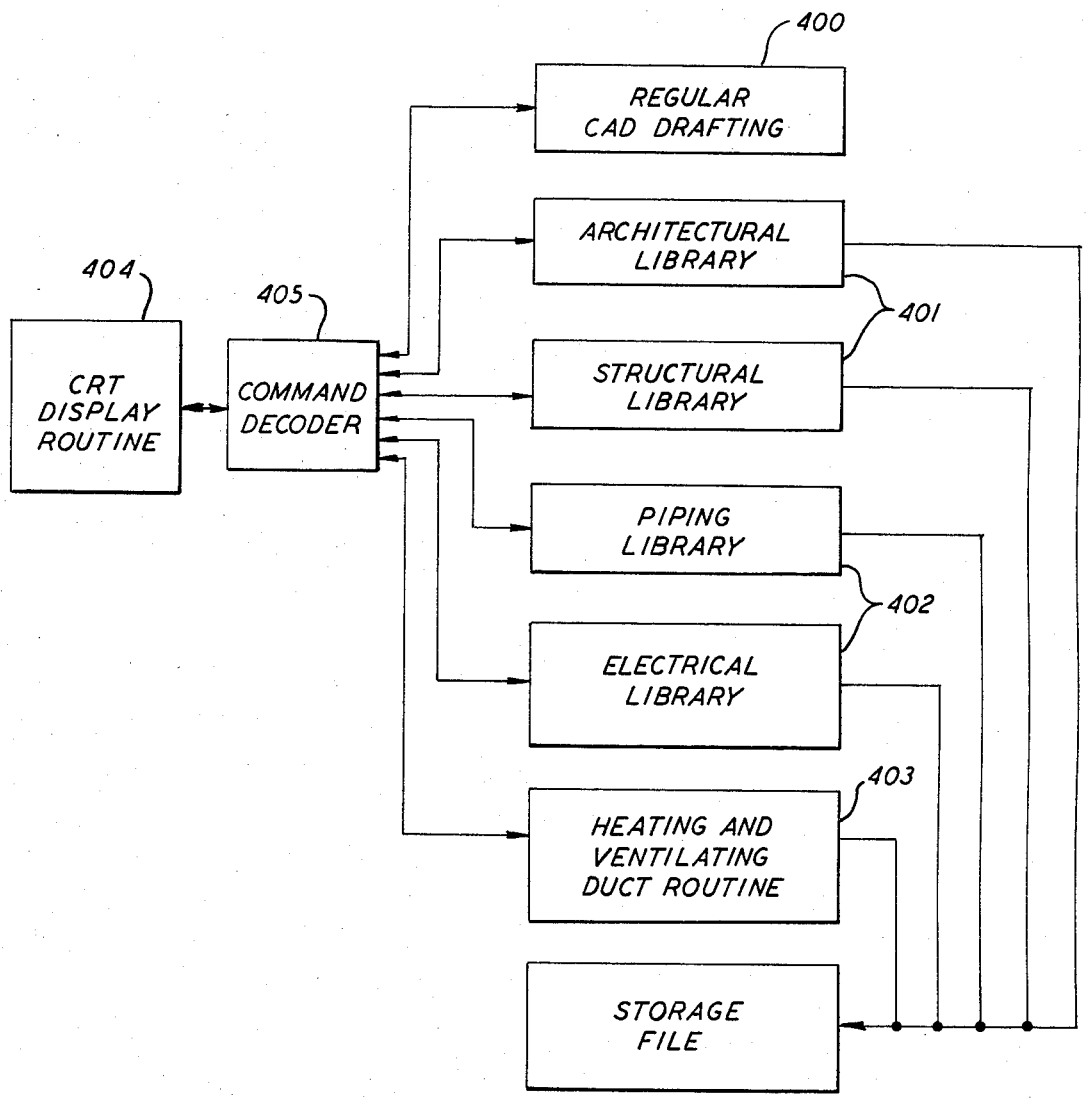
FIG. 22 is a flow chart showing the general sequence of programmed operations performed by a computer shown in FIG. 1.
FIG. 23, including
FIGS. 23A, 23B, and 23C, is a flow chart of steps executed by the computer of FIG. 1 in a heating and ventilating routine indicated in FIG. 22.
Figure 23A:
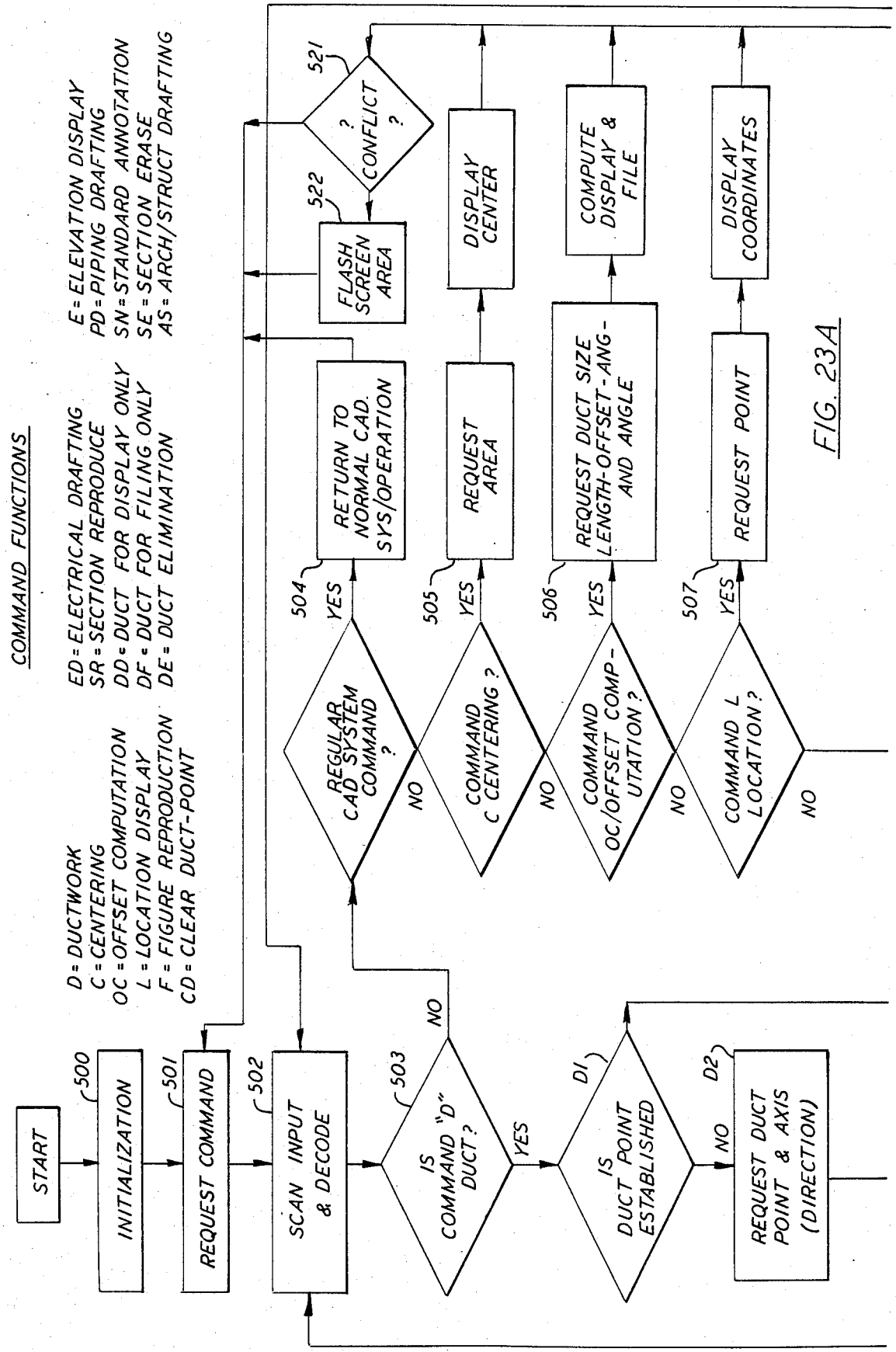
Figure 23B:
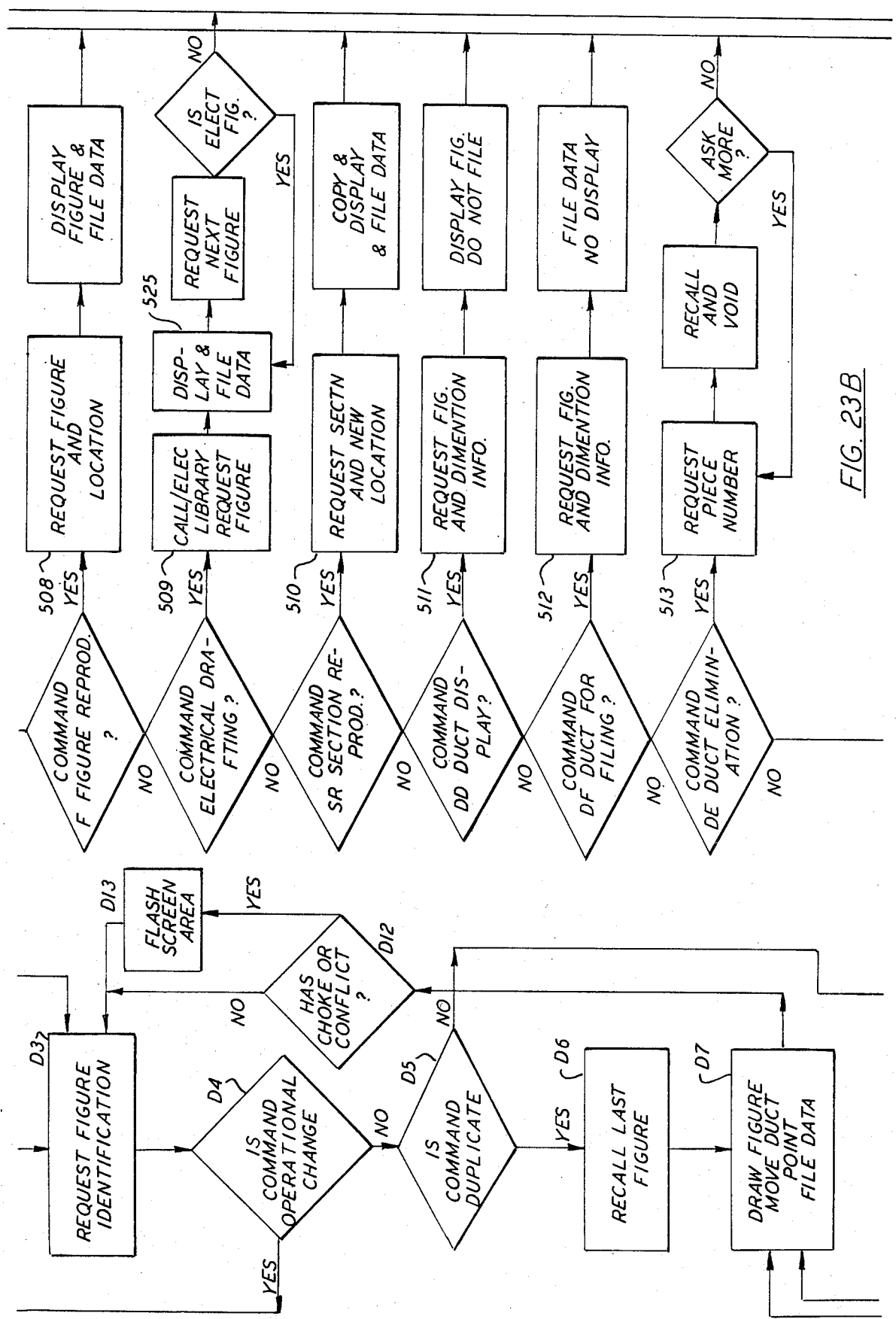
Figure 23C:
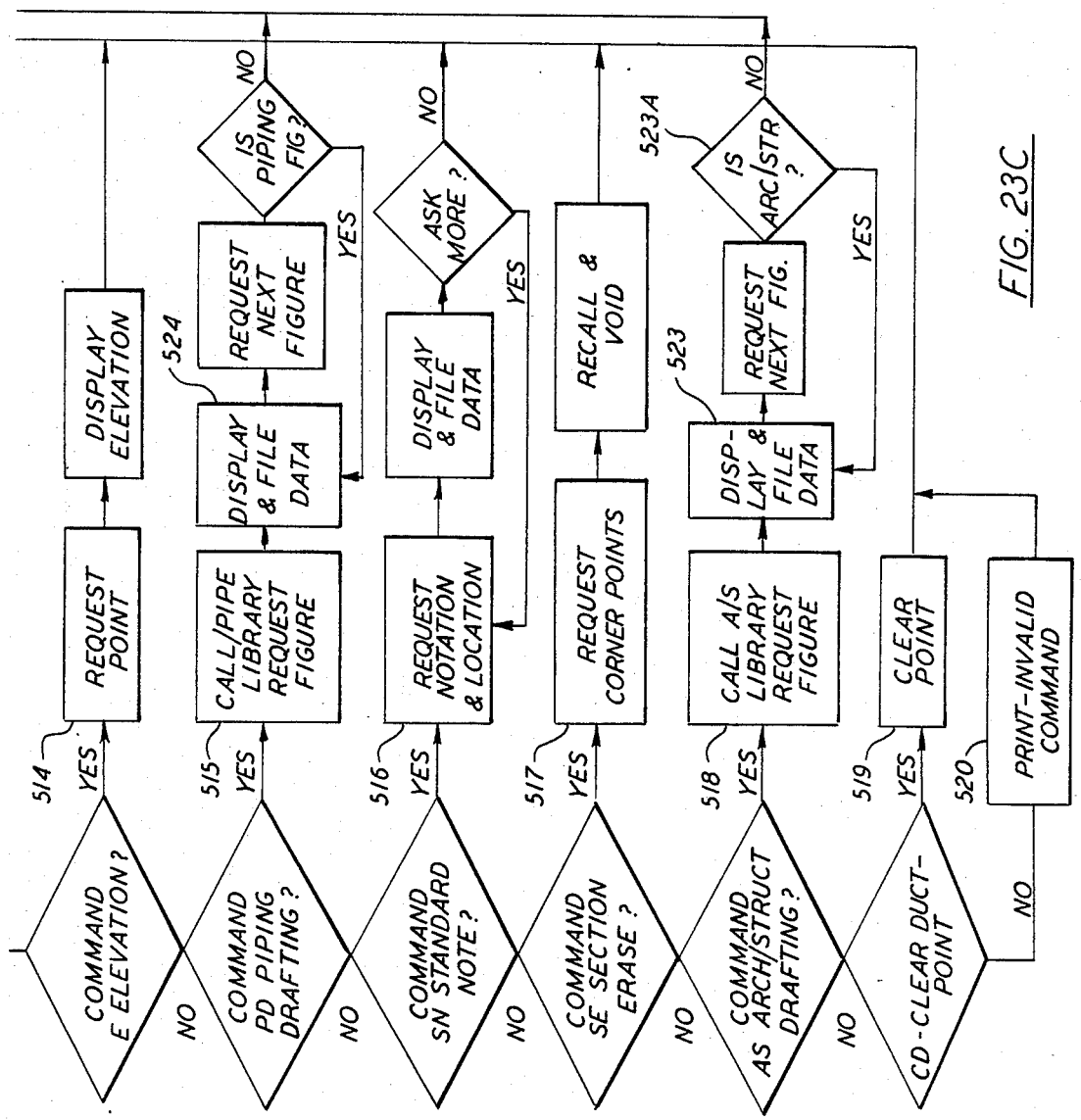
Figure 23C:
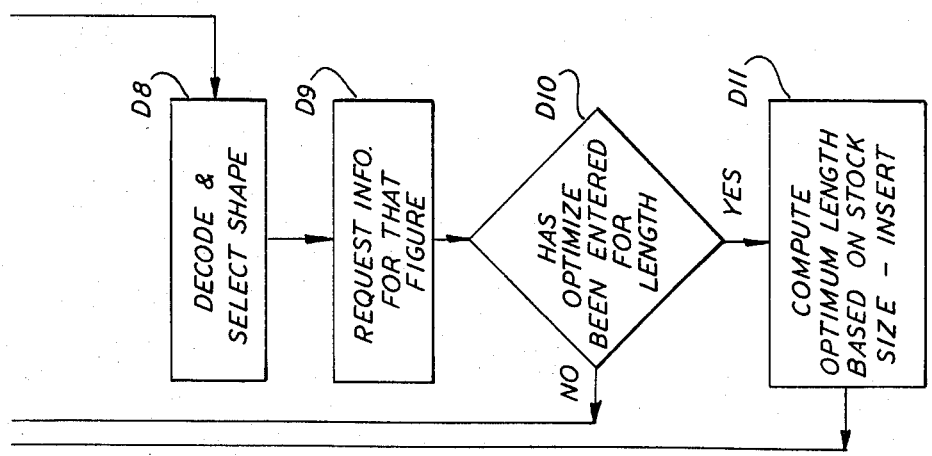

Before discussing the flowcharts of FIGS. 22 and 23 which illustrate the operation of the system and particularly computer 3, a general description will aid in an understanding of the invention.

The system shown generally in FIG. 1 uses a current state of the art CAD drafting system with the normal point to point and geometric drafting capability standard in computerized drafting systems of this type as an integral part. Such CAD drafting systems are well known in the computer art. By interconnecting the system of the present invention with the known CAD system, a ductwork designing and fabricating system is provided.

Construction drafting is in fact a combination of 5 major disciplines: Architectural, Structural, HVAC (Heating, Ventilating, and Air Conditioning), Plumbing and Electrical.

Beyond the architectural form of the structure, construction design today is a scientific discipline based on firmly established engineering design codes, building codes, and health, fire and safety codes.

As a result, structural and mechanical trades drafting is in effect partly the selection and implementation of the proper standard components to achieve the desired overall structure.

A common element in construction drafting is that after final approval by the licensed authorities, the components must then be "taken off" or listed from the drawing, for actual ordering, fabrication and delivery to the construction site.

The present invention provides a structured method and apparatus in which computerized assistance in selecting, drafting and checking assures proper adherence to the codes involved, provides automatic drafting of standard components and is structured to store for later ordering or fabrication of parts, the specific components of each discipline involved.

Duct systems represent the most tedious and high cost aspect of construction due to the customization required in each individual piece to suit the physical space limitations as explained hereinbefore.

Of the mechanical disciplines, duct systems are the most involved so that their design is the main object of the present invention. The flowcharts shown in FIGS. 22 and 23 illustrate how the system of the present invention operates and how it relates to the other construction disciplines.

As illustrated in the general flowchart of FIG. 22, microcomputer 3, prior to executing a program 403 for the design of a heating and ventilating conduit network in a building, performs programs 401 and 402 during which the microcomputer requests and assimilates data defining the structural members of the building and electrical and plumbing pipes, which, as heretofore explained, are generally designed prior to the air transport network. As schematically indicated at step 404 microcomputer 3 recurrently enters a CRT display routine during the execution of programs 401–403, which routine controls the display on the CRT screen of information requests and architectural drawings showing structural members and electrical and plumbing lines in accordance with entered information. The appropriate program section is selected through command decoder 405. Each program section accesses storage memory when necessary to retrieve data and to store details of the designed system for later transfer to pattern generating and fabricating unit 7.

The flowchart of general operation shown in FIG. 22 is shown in more detail in FIG. 23 including FIGS. 23A, 23B, and 23C. For ease of reference, the 16 command functions of the system which can be entered into the command decoder 405 are shown in the drawing and more specifically described below. These command functions determine into which program section computer 3 enters, e.g., the heating and ventilating routine, the plumbing routine, electrical routine, etc. Additionally, there are several commands which relate to duct work design such as the centering and offset commands and others which relate generally to drafting in any of the construction disciplines, such as the standard annotation command. Furthermore, the normal CAD drafting commands are also implemented.

After an initialization step 500, a command is requested by computer 3.

Normal CAD drafting system function commands are resident in the system program and upon entry will be recognized at 504 and diverted to normal CAD drafting system action. As these CAD functions are known, these CAD system commands are not listed on FIG. 23. As shown, when a normal CAD drafting command is received, the system returns to normal CAD system operation as shown at 504.

In normal operation, the first command, for example, AS, would be decoded at 503 and would then reference at 518 a library of standard architectural and structural shapes to simplify most of the drafting of these components and display on the CRT. As discussed above, the structural and architectural design is, of course implemented prior to the ductwork design. For example, numerous different types of walls, differing in thickness, finish, etc., are predrawn in the system library and can be automatically drawn between points indicated by simply locating the start and ending centerline points and entering the name assigned to the particular wall desired. The structural details, after the design is completed, can be displayed on the CRT screen as a background for the ductwork design.

Structural steel used in construction involves several hundred standard steel shapes, mostly I, H and L type beams and columns. These are all predrawn in the system library so that all steel can be automatically drawn by simply locating center points and entering the standard name of the steel section. Example 14 WF 320 (a 14" high H beam weighing 320 pounds per foot).

In addition to these preprogrammed libraries, the normal type of CAD drafting can be employed at any time to individually draw lines. This can be done by direct entry of coordinates of starting and ending points, or through the use of a joystick controller, which moves a cross hair type point indicator across the CRT display. Relative positioning is obtained by reference to fine grid lines displayed by the system in virtually any increment (one line per inch, per foot, per meter, etc.). By locating the cross hair at one point in the CRT display, depressing a button, then moving to a second point, and again touching a button, a line will be drawn on the CRT display screen, either solid or dotted, depending upon the button depressed.

The entry of the architectural and structural data precedes the drafting of the mechanical elements within the structure. As this data is entered, the computer both displays the lines on the CRT terminal representing the architectural and structural data and assimilates the digitized location in storage memory for eventual reproduction. Within the architectural and structural library, the system program will request data concerning the structural shapes and will display these figures on the CRT screen as shown in step 523 and at the same time file or store the data. The program will then request a new figure and remain in the loop defined by the architectural and structural library until a non-architectural or structural figure is requested, at which time it will exit the loop and return to 502 for a new command.

In a similar manner, a command of PD (Piping Drafting) would be decoded at 503 and directed to 515.

A command of ED (Electrical Drafting) would be directed to 509.

Upon the first D (Ductwork) entry, the system looks to see if a duct point has been established, as shown at D1 in FIG. 23.

This duct point is established as the leftmost point on a starting duct line drawn horizontally, or the bottommost point on a starting duct line drawn vertically. This line represents the starting end or width of the duct to be drawn. In direct combination with the duct point is an axis of direction, similar to the points of a compass, referred to in degrees. Zero degrees is straight up, 90 degrees is to the right, 180 degrees is to the bottom, etc. This establishes duct direction from the starting point.

Initially, the absence of a duct point will cause the system to request this information and the axis of direction, as shown at D2, thus establishing a starting point on the CRT display, which is then displayed against the background of the building structure as fed to the computer during execution of programs 401 and 402.

Following this step, the system will request figure identification at D3, which are the four basic figures T, O, B, E and a straight section J. These correspond to transition, offset, bevel, elbow and joint straight section. Additionally, the operator can enter H, A, L, F and D, corresponding to head or (duct cap), access door, an L angle frame, a flexible connection and a damper (fire damper, volume damper, etc.). These are standard duct accessories. A duplicate duct key indicates "duplicate last figure entered", to be described in more detail below.

At D4, the operator input is reviewed to see if an operational change was requested, so as to terminate the heating and ventilating duct routine. If not, at D5 the command is reviewed to see if it is a duplicate command. If it is, at D6 the previous figure would be redrawn. The duplicate command (D5) allows the previously drawn conduit section to be redrawn so as to be contiguous with the previous conduit section. This is, for instance, very helpful in drawing long, straight conduit sections. The duplication of the original conduit section continues until the computer discovers a conflict or obstruction with other parts of the designed system, such as the structure or piping, as shown at D12, at which point the conflict is indicated by a flashing indication on the CRT screen, as shown at D13. If the duplicate command is not entered, at D8 the particular shape requested T, O, B, E, etc. is recognized and at D9 the particular dimensions for that figure are requested.

Figure 24:
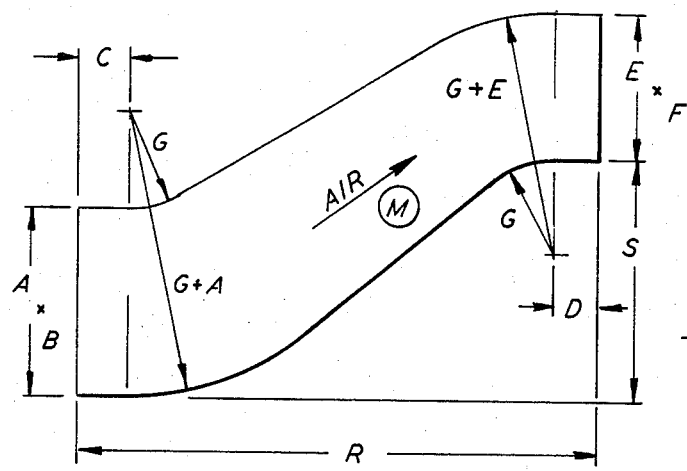
FIG. 24 is a diagram of an offset fitting similar to that shown in FIG. 5C.
Figure 25:
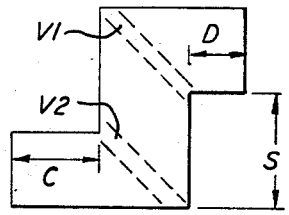
FIG. 25 is a diagram of a square offset fitting which can be designed and produced by a method and an apparatus in accordance with the present invention.

For example, if the selected conduit section is the offset fitting shown in FIG. 24, the computer requests the width A, the depth B and the length C of the straight portion at the entrance side of the fitting, the width E, the depth F and the length D of the straight portion of the exit side of the fitting, the radius of curvature G, the top pitch M, the total length R and the offset S. If the operator types in SB in response to the radius of curvature request, all radii are zero and the offset takes the form shown in FIG. 5C. If the response to the radius request is SO, the fitting is a Square Offset as illustrated in FIG. 25, representing the maximum permutation of an offset fitting in which the turning radii are zero, thus forming a straight line square type offset figure, and the computer 3 asks whether vanes are to be included. An affirmative reply results in vanes V1 and V2 shown in FIG. 25. Although top pitch M and the inclusion of vanes V1 and V2 are not necessary for layout computations, they are retained in disk storage 4 for subsequent transmission to pattern generating and fabricating unit 7. It is to be noted that a downward offset instead of the upward offset of FIG. 24 can be input to computer 3 by entering a negative number for the offset S.

Upon receiving all the requisite dimensions for the conduit section type selected, computer 3 computes the spatial coordinates of the conduit section and stores the results in a step D7 and, in a step D12, compares the computed location of the new duct piece with the existing physical structure as stored in memory. Upon detecting at a decision junction D12 an obstruction with the physical structure, or insufficient size allowances that would result in a choking or cross-section constriction of the conduit, computer 3 shows on the CRT display at step D13, the conflict to the operator by continuously flashing the conflict area, with corrective advice in the event of a choke also being displayed.

In the prior art, the length of pieces such as transitions, offsets, joints, are determined either by physical obstruction limitation or most often by draftsman's judgment so that none of the required parts of the segment will exceed standard stock sizes. For example, if a transition fitting that is 40 inches long has one side that is pitching 30 inches, the true length of that side is 50 inches plus allowances for end connections.

As a transition fitting may have different pitches on all sides, it would be very time consuming to individually compute these. Because of this, it is common practice to judge or estimate the maximum length of the fitting so as not to exceed stock size for any of the individual parts.

Should a portion of a fitting exceed stock size, it has a very costly and detrimental effect in that the section must then be "pieced" and welded or seamed from several smaller pieces.

To avoid this possibility, the result is that draftsmen will prudently estimate the length considerably less, resulting in waste of material.

To eliminate this waste and "estimating", the system utilizes a built in optimization step, at D10. If, in response to length the operator touches the answer key without entering a dimension, it signals the computer to instantly compute all pitch gains on the fitting and compute the length that will result in no or least waste. These optimization steps utilize trigonometric formulae which themselves are well known in the building trades.

At D11 this optimization takes place. The fitting is then drawn at D7, the data stored, and the duct point moved accordingly for the next conduit section.

Following this, at D12, the resultant figure is checked for choke or conflict occurrence, as described. A choke occurs when the amount of offset of a given section is so great, relative to its length, that a trapazoid effect or reduction in the center portion of the area of the fitting results.

As this is often difficult if not impossible to detect visually, it has been made an automatic computation. If a choke is detected, the fitting will immediately start flashing on the screen with a note "can length be made NN inches?" with NN as the required length to eliminate the choke.

A conflict occurs when a portion of the drawn figure is found to occupy the same space as a predrawn priority figure such as steel beams, columns, fire proofing, fire walls, or other trades such as piping and electrical.

In all cases the segment interfering will continue to flash on the screen until the operator takes corrective action.

In the event of fire wall penetration, the only corrective action accepted is a fire damper as required by the building code.

Ductwork will then continue to be requested and entered at D3, repeating the cycle. Should a different section of duct need to be designed (e.g. on a different floor of a building) the command CD clears the Duct Point and allows a new run to be initiated.

In most duct layouts, the direction of runs are horizontal and vertical with 90 degree turns. Quite often however, parallel segments of duct must be interconnected through a long run of duct at 45 degrees, or 30 degrees, etc. This is an involved geometrical problem that can be solved with mathematical and trigonometric formulae or scaling. Both methods are in common use in the prior art.

To eliminate this time and possible error, the command OC (Offset Computation) (506) references these formulas which have been automated in the program. Given the duct size, length and offset, it will automatically "section" the figure into 2 bevels (at each end) and a straight length of sectioned joints connecting them.

In addition to storing the dimensions of each conduit entry for later direct transfer to pattern generating and fabricating unit 7, the CAD system itself keeps a digitized image of the entire drawing in memory. The invention accesses this location in memory in many ways particularly advantageous to construction drafting as can be seen in a review of the system command functions.

Most air outlets are centered on rooms, lights, etc. for both purposes of appearance and air distribution. Much of a draftman's time is spent in scaling or recomputing centers of areas to locate final outlet locations. The C Centering command, issued after indicating an area using the joystick cross hairs will automatically display the exact center of the area referenced with coordinates, as shown by step 505 in FIG. 23.

The L Location Command, after indicating a spot with cross hairs, will cause the exact building coordinate locations to be displayed, as shown at 507.

The F (Figure Reproduce) allows a library figure to be reproduced automatically at the location indicated. This is shown at step 508.

The command ED (Electrical Drafting) recalls the electrical library of figures, forms and entries to expedite electrical drafting, as shown at step 509.

The command SR (Section Reproduce) allows a copy of a portion of the drawing to be transferred to any other area by corner point location at any "rotation" indicated. This is shown at 510.

The command (Duct Display) (511), allows duct to be drawn for temporary evaluation, but not stored in memory.

The command DF (Duct for Filing Only) (512), allows addition of duct to the storage file that is not visible on the drawing or display. For example, a vertical riser duct would only appear as a box in a plan view drawing.

The command DE (Duct Elimination) (513), permits the user to void or erase duct by indicating the identification piece number.

The command E (Elevation) (514), causes the elevation of the point "cross haired" to be displayed.

The command PD (Pipe Drafting) (515), recalls the piping library of figures, forms and entries for pipe detailing.

The command SN (Standard Notation) (516), allows standard annotations to be inserted where spotted by "cross hairs".

The command SE (Section Erase) (517), allows any area to be erased in total by locating 2 opposite corners.

The command AS (Architectural/Structural Drafting) (518), mentioned in the example previously, recalls the architectural and structural library of figures, forms and entries.

The command CD (Clear Duct Point) (519), enables a new starting location to be requested for a different run of conduit.

At 520, should none of the above commands occur, computer 3 will display "invalid command" and repeat a request for a new command.

From the program illustrated in flow chart form in FIG. 23 it will be readily understood that a computer assisted design apparatus and method in accordance with the present invention offers many time saving and cost cutting features. When no obstruction limits the length of a piece, the computer will automatically, and based upon highly efficient optimization formulas, select the optimum length. This is the length, within the proper engineering specifications, which will result in the least amount of wasted material in fabrication. In addition, when long runs of straight sections are required, a duplication command will initiate automatic "building block" replication until an obstruction is encountered and, if a section is ordered which will conflict with an existing structure, it is instantly sensed and the operator advised by a "hatched" flashing of the conflict.

Another advantage of the computer assisted design features incorporated in the present invention is the automatic centering represented in FIG. 23 by step 505. Due to the engineering and esthetic advantages of air diffusers (outlets) being centrally located in a room, or between lighting or ceiling tiles, a good percentage of a duct detailer's time is spent in computing these "centers" based on room and ceiling arrangements.

This large time expenditure is eliminated by the automatic centering feature which will immediately locate by steel, wall or building datum, the exact center of any given area and display both this and tie-in dimensions to relative steel structure. It is to be noted that most duct systems are installed *before* the walls or ceilings exist in new structures. Thus, it is necessary that dimensional information be given relative to the existing steel or concrete superstructure.

The automatic offset sectioning represented in FIG. 23 by step 506 includes the computation of center line dimensions which must be further broken into reasonable pieces by using mathematics and trigonometric formulas or "scaling", both of these methods being in common use throughout the heating and ventilating industry. By introducing these formulas into the program of computer 3, a 20-foot-long offset having an angle of 30 degrees is automatically sectioned into a 30 degree bevel, 23 feet of straight sections and a second 30 degree bevel. Steps D12 and 521 represent an automatic assurance of fire wall protection. Fire walls of a given rated thickness protect the various exit areas of a building and tend to contain fire and prevent rapid spread. According to extant fire codes, all duct penetrations through such walls must have fire dampers. While it would never be intentionally omitted, it is easy to forget or overlook a penetration of a duct through such a wall in a complex maze of piping, duct, electrical etc. In accordance with the present invention, all fire wall penetrations will initiate immediate flashing of the penetration on the CRT display 1 until a damper is indicated.

Other programming features of the present invention not indicated in FIG. 23 are (1) automatic duplication informing, (2) automatic gauge selecting and (3) automatic choke indicating. In accordance with the first feature, when similar pieces have been ordered at different times, the computer will notify the operator by flashing both similar pieces on the CRT screen. This knowledge allows advantages in numbering and identification as well as fabrication. In accordance with the second feature, the gauge of sheet material used in constructing the designed conduit network is preferably automatically selected in accordance with job specifications and pressure design. The gauge or thickness of metal required by fire codes and engineering design specifications varies in accordance with the size and length of each fitting. Based on the current industry standard ASHREA and "SMACNA" specifications (ASHRAE: American Society of Heating, Refrigeration and Air Conditioning Engineers; SMACNA: Sheet Metal and Air Conditioning National Association), there are over 183 possible gauge selections determined by size, pressure and length of each piece. While no one would purposely pick the wrong gauge, it is easy to make a mistake. Automatic gauge selection reviews each piece and not only selects the proper gauge, but will indicate "reinforcing required" where necessary.

Automatic choke indicating, the third feature listed above, consists of a constant computer check of every piece for "choke" as described above with respect to step D12, i.e., for the existence of a central or intermediate conduit cross-section which is smaller than the cross-sections at the ends of the piece. Choke often arises in the detailing process owing to the avoidance of obstructions. It also often occurs simply by choosing a length that is in fact too small, but the "choke" is not easy to see often on a sloped or radius offsetting section. Chokes are very detrimental to engineering air distribution and often just one such choked fitting can cause an entire portion of a building to be uncomfortable due to an insufficient air supply. Upon detecting a choke, computer 3 will flash a "choke" message on the CRT display and advise the operator of the dimensional corrections to eliminate the choke.

Pursuant to an automatic delivery numbering feature of the present invention, computer 3 will automatically, upon command, assign consecutive piece numbers for shipping and job identification, thereby saving further detailing time. Moreover, the programming includes an automatic inventory and redesign feature whereby the system will upon command, immediately compute by gauge and material, with optimizations considered, the exact metal required for fabrication of the conduits displayed on CRT 1.

This computation capability in conjunction with redesign functions enables the draftsman to constantly review the project and possibly introduce redesign savings.

Other time and money saving aspects of this invention relate to the drafting machine 5 operated under the control of computer 3. For example, assigning a particular line structure to each trade (plumbing, heating, electrical, etc.), enables separate drawings to be produced on the drafting plotter for each trade at little extra cost. At the same time, the difference in line structure enables each trade to recognize its installation even though only on a 2 color blueprint. Furthermore, upon preparation of separate copies of the original drawing background for each trade, each contractor can work independently and concurrently in drafting its work. Placement of the completed drawings on a light table then facilitates the detection and marking of conflicts. Through the use of digitizer 2, required revisions can then be entered into the system of FIG. 1 and a record immediately produced for all firms by means of drafting machine 5.

Figure 26A:
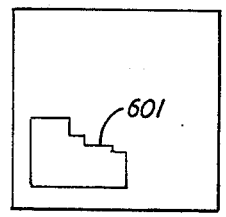
FIGS. 26A through 26G are diagrams of drawings displayed on a CRT I/O device in FIG. 1 at different times during the program execution generally shown in FIG. 22.
Figure 26B:
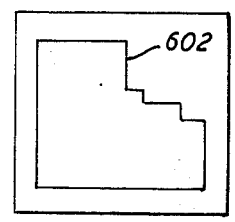
Figure 26C:
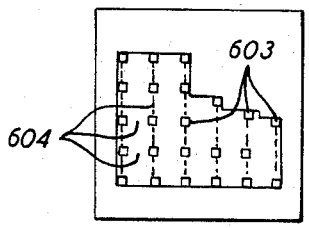

Another advantage of a computer assisted design apparatus and method according to the present invention is the automatic scaling implemented by computer 3. Upon establishing the outline or area in which he wishes to work, the designer or draftsperson may draw the desired conduit sections on the CRT screen by entering coordinates or spot to spot distances. Alternatively, he can enter fitting type and dimensions, as described above with reference to FIG. 23. The size or scale of the drawing on the CRT can then be changed merely by pushing a button, the relative positions and proportions of various physical features being automatically maintained by computer 3. For example, if a generally L-shaped area 601 such as shown in FIG. 26A is drawn on the CRT, pressing a button results in an enlarged shape 602 filling the entire screen, as illustrated in FIG. 26B. Steel support members 603 and walls 604 may then be inserted, as shown in FIG. 26C, the additions being implemented by an execution of structural layout routine 401 by computer 3. The completed representation of the supporting superstructure is memorizable by the computer upon command and thereby saved as a "layer" so that other draftsmen, e.g. from other trades, can recall just the background. Upon completion of the structural design and the electrical and plumbing design, the 3 separate background layers may be called up by the computer and displayed on the CRT screen during the design of the heating and ventilating network. For simplicity, FIGS. 26C through 26G dispense with the electrical and plumbing systems.

Figure 26D:
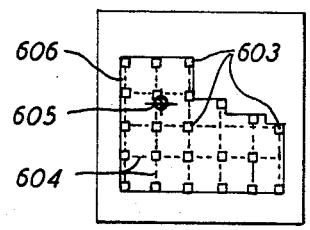
Figure 26E:
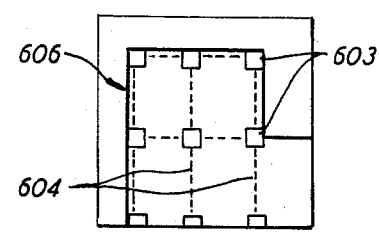
Figure 26F:
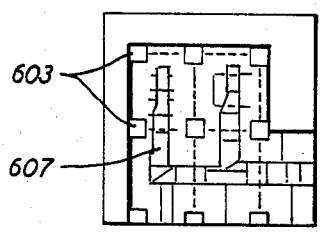
Figure 26G:
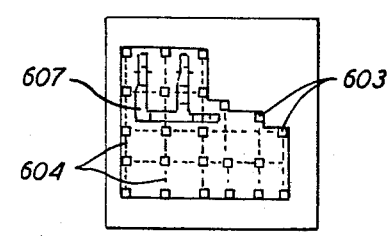

Upon positioning a cursor or cross-hairs 605 to a desired position, as shown in FIG. 26D and pressing a "zoom" key, the scale of the drawing is enlarged and the corner 606 defined by the position of cross-hairs 605 fills the entire screen, as illustrated in FIG. 26E. The conduit network 607 in that corner of the structure may then be designed as heretofore described with reference to FIG. 23. A completed design is shown in FIG. 26F. Upon a pressing of a "display" key, the entire drawing returns to the screen, including the newly designed heating and ventilating ducts 607, as shown in FIG. 26G. Computer assisted design in accordance with the present invention requires only trade knowledge and not drafting technique. Moreover, learning time is cut to a minimum, owing to the presence of many computer assists. One area of assistance arises from the storage in the system of FIG. 1 of a complete steel directory. All that is necessary is that the draftsman locate a column center and type in the identity of the steel beam, such as 14 WF 320. The result is a perfectly drawn column on the CRT display 1. Similarly, walls, hatching, registers, grilles and diffusers are in memory and can be automatically drawn. Moreover, any drawing shown on the CRT display can be printed on paper by means of drafting machine 5, the drawings being printed to any suitable scale.

There is thus provided a method and apparatus by which an operator, ordinarily unskilled in the field, can, in response to simple requests posed by a computer, provide basic conduit type and dimensional information which, in accordance with the program of the present invention, will yield first, the pattern types and dimensions of the patterns required for creation of a three-dimensional duct fitting and, second, the patterns themselves, which patterns are laid out in a spatial relationship and which optimizes the use of material; positions all components of a fitting into relative juxtaposition; provides optimized cutting paths so that the least amount of cuts need be made to separate the patterns; preferably provides indicia to identify the patterns and the job to which they relate; preferably separates the patterns either in the form of individual patterns or by a single widthwise cut into a group of patterns which together form a fitting; and preferably provides hard copy information for use for on-the-job fabrication. The entire operation is accomplished with greater accuracy than heretofore permitted even with the intervention of the most skilled artisan and in a fraction of the time heretofore required. Time is saved in particular by storing the pattern type and dimensional data derived by computer 3 (FIG. 1) and automatically feeding this data to computer 20 (FIG. 2), thereby eliminating detailing time.

It will be understood that the above description is exemplary of that which falls within the scope of the appended claims and that various modifications may be made without departing from the scope of the invention.

What is claimed is:

1. A method for at least partially automatically designing a heating and ventilating network and automatically producing patterns of the closed sides of conduit sections in the designed network, said patterns being utilizable to produce conduit section sides from sheet material blanks, said method comprising in combination the steps of:

storing, in digital form in memory means, generic dimensional requirements of basic conduit section types from which substantially all conduit networks can be constructed and, in addition, the configurations of a group of basic pattern types having nominal dimensions from which the sides of all conduit sections in the heating and ventilating network can be constructed;

entering input data into a computer operatively connected to said memory means said input data including the section type and dimensions of at least one conduit section in said heating and ventilating network, the entered dimensions of said one conduit section corresponding to the dimensional requirements stored in said memory means of the section type of said one conduit section;

electronically deriving in said computer actual dimensional and patters type data for each side of said one conduit section from the entered dimensions and section type thereof;

storing in said memory means said actual dimensional and pattern type data;

generating, from said actual dimensional and pattern type data, the pattern of each side of said one conduit section, each of said patterns being developed from selected ones of said basic pattern types in response to said actual dimensional and pattern type data stored in said memory means;

positioning said developed patterns in a series of groupings; determining which of said groupings yields a minimum surface area so as to provide for optimum material usage and generating digital data representing said optimum grouping; supplying the digital data representing said optimum grouping to an X-Y plotting table, said data being in block format and including digital data representing the starting point for each pattern in X-Y format and sequential digital data in X-Y format representing the contour of each pattern; and plotting said patterns in accordance with said digital data on a sheet of material on said plotting table.

2. The method defined in claim 1, further comprising the step of electronically controlling a drafting machine, via said computer, to automatically produce architectural drawings of said heating and ventilating network at least partially in response to said actual dimensional and pattern type data stored in said memory means.

3. The method defined in claim 1, wherein said memory means includes a first memory for storing in digital form the generic dimensional requirements of basic conduit section types and a second memory for at least temporarily storing said actual dimensional and pattern type data upon derivation thereof by said computer, further comprising the step of automatically transmitting said actual dimensional and pattern type data from said second memory to an additional computer which implements the steps of generating the pattern of each side of said one conduit section, positioning the developed patterns in a series of groupings and determining which of said groupings yields a minimum surface area.

4. The method defined in claim 1, further comprising the steps of loading into said computer additional input data representing the dimensions of a physical structure in which said heating and ventilating network is to be located, comparing the entered dimensions of said one conduit section with said additional input data to determine whether a spatial conflict exists and communicating to a human operator the existence of such a spatial conflict upon a detection thereof.

5. The method defined in claim 4, further comprising the step of automatically determining a centralized location, with respect to a wall of said physical structure defined by said additional input data, of a duct branch connected to said heating and ventilating network.

6. The method defined in claim 4, further comprising the steps of comparing the entered dimensions of said one conduit section with said additional input data to determine whether said one conduit section is traversing a fire wall in the physical structure defined by said additional input data and automatically signaling to a human operator the need for a damper in said one conduit section upon detecting a traversal of a fire wall thereby.

7. The method defined in claim 1, wherein the step of entering input data into a computer includes the entering of load requirements of said heating and ventilating network, further comprising the step of automatically selecting the gauge of said sheet of material in accordance with said load requirements.

8. The method defined in claim 1, wherein the step of entering input data into a computer includes the entering of load requirements of said heating and ventilating network, further comprising the step of automatically determining whether reinforcement of the sides of said one conduit section is necessary.

9. The method defined in claim 1 wherein the step of deriving actual dimensional and pattern type data for each side of said one conduit section includes the step of automatically estimating an optimum length of said one conduit section in accordance with available blank sizes of sheet material.

10. The method defined in claim 1, further comprising the steps of loading into said computer additional input data representing the dimensions of a physical structure in which said heating and ventilating network is to be located and automatically assigning the dimensions of said one conduit section to further conduit sections in response to a duplication command from a human operator, electronically calculating coordinates of said further conduit sections relative to said one conduit section and said physical structure, comparing the coordinates of said further conduit sections with said additional input data to determine the existence of an obstruction and ceasing duplication of said one conduit section and communicating to a human operator the existence of an obstruction upon detecting same.

11. In a method for automatically producing patterns for the sides of a three dimensional product which can be fabricated from sheet material, such as a ventilating duct fitting, said patterns being produced in response to the inputting of actual dimensional and pattern type data relating to said product, the improvement comprising the steps of:

storing, in digital form in memory means, configurations and dimensional requirements of basic product types from which all possible variations of the three-dimensional product may be produced;

entering input data into a computer operatively connected to said memory means, said input data including product type and dimensions of said product, the entered dimensions corresponding to dimensional requirements, stored in said memory means, of the product type entered; electronically deriving in said computer actual dimensional and pattern type data for each side of said product from the entered product type and dimensions of said product;

storing in said memory means said actual dimensional and pattern type data; and producing patterns for the sides of said product in response to said actual dimensional and pattern type data stored in said memory means.

12. Apparatus for partially automatically designing a heating and ventilating network and automatically producing patterns of the closed sides of conduit sections in the designed network, said patterns being utilizable to produce conduit section sides from sheet material blanks, said apparatus comprising:

memory means for storing in digital form generic dimensional requirements of basic conduit sections from which substantially all conduit networks can be constructed and for storing in digital form the configurations of a group of basic pattern types having nominal dimensions from which the sides of all conduit sections in the heating and ventilating network can be constructed;

means for entering input data including the section type and dimensions of at least one conduit section in said heating and ventilating network, the entered dimensions of said one conduit section corresponding to the dimensional requirements, stored in said memory means, of the section type of said one conduit section;

means including a computer for electronically deriving actual dimensional and pattern type data for each side of said one conduit section from the entered dimensions and section type thereof, said computer being operatively connected to said memory means and said means for entering input data;

means for transmitting to said memory means for storage therein said actual dimensional and pattern type data;

means for generating, from said actual dimensional and pattern type data, the pattern on each side of said one conduit section, each of said patterns developed from selected ones of said basic pattern types in response to said actual dimensional and pattern type data;

means for positioning said developed patterns in a series of groupings;

means for determining which of said groupings yields a minimum surface area so as to provide for optimum material usage and means for generating digital data representing said optimum grouping;

means for supplying the digital data representing said optimum grouping to an X-Y plotting table, said data being in block format and including digital data representing the starting point for each pattern in X-Y format and sequential digital data in X-Y format representing the contour of each pattern; and means for plotting said patterns in accordance with said digital data on a sheet of material on said plotting table.

13. The apparatus defined in claim 12, further comprising a drafting machine and means, including said computer, for electronically controlling said drafting machine to automatically produce architectural drawings of said heating and ventilating system at least partially in response to said actual dimensional and pattern type data stored in said memory means.

14. The apparatus defined in claim 12 wherein said memory means includes a first memory for storing in digital form the generic dimensional requirements of basic conduit section types and a second memory for at least temporarily storing said actual dimensional and pattern type data upon derivation thereof by said computer, further comprising an additional computer for implementing the steps of generating, positioning and determining and means for automatically transmitting said actual dimensional and pattern type data from said second memory to said additional computer.

15. The apparatus defined in claim 12, further comprising means for loading into said computer additional input data representing the dimensions of a physical structure in which said heating and ventilating network is to be located, means for comparing the entered dimensions of said one conduit section with said additional input data to determine whether a spatial conflict exists and means for communicating to a human operator the existence of such a spatial conflict up on a detection thereof.

16. The apparatus defined in claim 15, further comprising means for automatically determining a centralized location, with respect to an area of said physical structure defined by said additional input data, of a duct branch connected to said heating and ventilating network.

17. The apparatus defined in claim 15, further comprising means for comparing the entered dimensions of said one conduit section with said additional input data to determine whether said one conduit section is traversing a fire wall in the physical structure defined by said additional input data and means for automatically signaling to a human operator the need for a damper in said one conduit section upon detecting a traversal of a fire wall thereby.

18. The apparatus defined in claim 12, further comprising means for entering load requirements of said heating and ventilating network, and means for automatically selecting the gauge of said sheet of material in accordance with said load requirements.

19. The apparatus defined in claim 12, further comprising means for entering load requirements of said heating and ventilating network and means for automatically determining whether reinforcement of the sides of said one conduit section is necessary.

20. The apparatus defined in claim 12, further comprising means for automatically estimating an optimum length of said one conduit section in accordance with available blank sizes of sheet material.

21. The apparatus defined in claim 12, further comprising means for loading into said computer additional input data representing the dimensions of a physical structure in which said heating and ventilating network is to be located, means for automatically assigning the dimensions of said one conduit section to further conduit sections in response to a duplication command from a human operator, means for electronically calculating coordinates of said further conduit sections relative to said one conduit section and said physical structure, means for comparing the coordinates of said further conduit sections with said additional input data to determine the existence of an obstruction and means for ceasing duplication of said one conduit section and communicating to a human operator the existence of an obstruction upon detection thereof.

22. In an apparatus for automatically producing patterns for the sides of a three-dimensional product which can be fabricated from sheet material, such as a ventilating duct fitting, said patterns being produced in response to the inputting of actual dimensional and pattern type data relating to said product, the improvement comprising memory means for storing in digital form configurations and dimensional requirements of basic product types from which all possible variations of the three-dimensional product may be produced;

a computer operatively linked to said memory means;

means for entering into said computer input data including product type and dimensions of said product, the entered dimensions corresponding to dimensional requirements, stored in said memory means, of the product type entered;

means including said computer for electronically deriving actual dimensional and pattern type data for each side of said product from the entered product type and dimensions of said product;

storage means for at least temporarily memorizing said actual dimensional and pattern type data; and means for producing patterns for the sides of said product in response to said actual dimensional and pattern type data stored in said memory means.

23. The apparatus defined in claim 22, further comprising means for automatically transmitting said actual dimensional and pattern type data from said storage means to said means for producing patterns.

* * * * *

UNITED STATES PATENT AND TRADEMARK OFFICE
CERTIFICATE OF CORRECTION

PATENT NO. : 4,551,810

DATED : November 5, 1985

INVENTOR(S) : Richard W. Levine

It is certified that error appears in the above-identified patent and that said Letters Patent is hereby corrected as shown below:

Col. 5, line 61, delete "," after "embodiments".

Col. 8, line 11, insert "," after "memory".

Col. 8, Position 17, change "&" to --+--.

Col. 8, Position 18, change "&" to --+--.

Col. 8, Position 22, change "R" to --r--, both occurrences.

Col. 9, Position 45, after "+", change "I" to --1--.

Col. 16, line 45, after "fittings" insert --.--.

Col. 16, line 65, after "identified" insert --,--.

Col. 18, line 14, change "FIG." to --FIGS.--, second occurrence.

UNITED STATES PATENT AND TRADEMARK OFFICE
CERTIFICATE OF CORRECTION

PATENT NO. : 4,551,810

DATED : November 5, 1985

INVENTOR(S) : Richard W. Levine

Page 2 of 4

It is certified that error appears in the above-identified patent and that said Letters Patent is hereby corrected as shown below:

At Cols. 19, 20, 21 and 22, the Table should read as follows:

UNITED STATES PATENT AND TRADEMARK OFFICE
CERTIFICATE OF CORRECTION

PATENT NO. : 4,551,810

DATED : November 5, 1985

INVENTOR(S) : Richard W. Levine

Page 3 of 4

It is certified that error appears in the above-identified patent and that said Letters Patent is hereby corrected as shown below:

Table

UNITED STATES PATENT AND TRADEMARK OFFICE
CERTIFICATE OF CORRECTION

PATENT NO. : 4,551,810   Page 4 of 4

DATED : November 5, 1985

INVENTOR(S) : Richard W. Levine

It is certified that error appears in the above-identified patent and that said Letters Patent is hereby corrected as shown below:

Col. 25, line 40, change "arriage" to --carriage--.

Col. 30, line 20, change "trapazoid" to --trapezoid--.

In the Claims:

Col. 35, line 13, insert --,-- after "means".

Col. 35, line 21, change "patters" to --pattern--.

Col. 35, line 33, after "groupings;" begin a new subparagraph with "determining".

Col. 38, line 22, change "up on" to --upon--.

Signed and Sealed this

Thirtieth Day of September 1986

[SEAL]

Attest:

DONALD J. QUIGG

Attesting Officer

Commissioner of Patents and Trademarks

REEXAMINATION CERTIFICATE (2662nd)
United States Patent [19]
Levine

[11] B1 4,551,810
[45] Certificate Issued  Sep. 5, 1995

[54] METHOD AND APPARATUS FOR DESIGNING DUCT WORK FOR PRODUCING PATTERNS FOR CONDUIT SECTIONS IN THE DESIGNATED DUCT WORK

[75] Inventor: Richard W. Levine, Dobbs Ferry, N.Y.

[73] Assignee: Construction Technology, Inc., Elmsford, N.Y.

Reexamination Requests:
No. 90/003,027, Apr. 13, 1993
No. 90/003,327, Feb. 1, 1994

Reexamination Certificate for:
Patent No.: 4,551,810
Issued: Nov. 5, 1985
Appl. No.: 536,648
Filed: Sep. 28, 1983

Certificate of Correction issued Sep. 30, 1986.

Related U.S. Application Data

[63] Continuation-in-part of Ser. No. 503,699, Jun. 13, 1983, which is a continuation-in-part of Ser. No. 402, 607, Jul. 28, 1982, abandoned.

[51] Int. Cl.$^6$ .............................................. G06F 19/00
[52] U.S. Cl. ............................... 364/474.24; 364/191; 364/474.05; 364/474.09; 364/474.13; 364/474.25; 364/512
[58] Field of Search ............... 364/468, 474.24, 474.09, 364/505, 506, 512, 148, 191, 192, 193, 474.02, 474.22–474.27; 83/32, 72–76, 76.1–76.9, 936

[56] References Cited

PUBLICATIONS

"Compuduct TM : The Better Way", Construction Technology, Inc. (CTI) 1975 (Reexam Ex. C.
"Special Offer Duct Detailers Speed Kit" 1976 (Ex. M).
"Construction Technology, Inc.'s New Compuduct Auto-Plot Provides Layout of Sheet Metal Fitting in Three Minutes," Snips, Nov. 1980, p. 40 (Ex. E).
"Compuduct Auto-Plot Demonstration at ASHRA-E-ARI Show Draws Record Crowds," Snips, Mar. 1981, pp. 40–41 (Ex. F).
"The Compuduct Auto-Plot TM ," Snips, Mar. 1981, p. 63 (Ex. G).
Quotation and Equipment Description from CTI to BHW Sheet Metal dated Jan. 29, 1981 (6 pages) (Ex. H).
Publicity release re the "Auto-Plot TM Extension to Compuduct" with three photographs of the system demonstrated at the 1981 ASHRAE Show (Ex. I).
"Computerized Plotting System Lays Out Sheet Metal Fittings Directly, Quickly, Economically,", Air Conditioning, Heating and Refrigeration News Dec. 1, 1980, p. 14 (Ex. J).
Segroves, J. L., "Shop Data Systems, Inc. Duct Detailing and Fitting Blanking," Shop Data Systems, Inc. 1976 (Ex. K).
"Quickduct," Shop Data Systems, Inc. 1980 (Ex. L).
Griesheim, "OMNIDATA ® Intelligent Coding System for Cutting Machines and other Tools," 33 pages (Ex. O); date unknown.
Schiffko GmbH, "Schiffko Evd System": Hamburg, Germany (w/English translation) (Ex. P); date unknown.

(List continued on next page.)

Primary Examiner—Joseph Ruggiero

[57] ABSTRACT

A method and apparatus for partially automatically designing a conduit network and automatically producing patterns for cutting out the sides of conduit sections from laminar material. The CAD-CAM system eliminates the detailing of fittings and other components of a heating and ventilating system, pattern type and dimensional data being fed directly, i.e., without human intervention, from a memory in a CAD system to a CAM pattern generating and fabricating system. The patterns for the closed sides of the conduit network are developed from mathematical relationships specifying the geometry of basic pattern types. The patterns so developed are computed for optimum positioning with other developed patterns, most preferably with alignment of similarly shaped edges for sheet material optimization, and preferably with adjacent grouping of the patterns for each end product to facilitate location and assembly and, most preferably, in such a manner that each grouping can be severed from the sheet material with a single cut to facilitate use of sheet or coil stock shearing machinery.

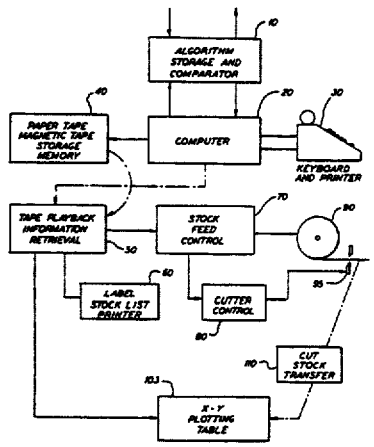

PUBLICATION DOCUMENTS

"Programm Ubersicht Des Schiffko-Systems," Oct. 1976; Supplements as of Aug. 1977 (w/English translation) (Ex. Q).

"Bauteile Abwicklung," (Construction Units Transaction) 11 pages (w/English translation) (Ex. R).

Greisheim, OMNIDATA computer system, 8 pages (In Ex. S, attachment A); date unknown.

Greisheim, Rechnersystem OMNIDATA (German), 8 pages (In Ex. S, attachment B); date unknown.

Greisheim, Ordinateur OMNIDATA (French), 8 pages (In Ex. S attachment C); date unknown.

Greisheim, System komputerowy OMNIDATA (Russian) 8 pages (In Ex. S, attachment D); date unknown.

Greisheim, OMNIDATA Intelligent coding system for cutting machines and other machine tools, 32 pages (In Ex. S, attachment E); date unknown.

Greisheim, OMNIDATA Intelligentes Codiersystem für Schneid-und Werkzeugmaschinen (German), 31 pages (In Ex. S, attachment F); date unknown.

Greisheim, OMNIDATA Systeme de programmation intelligent pour machines etc. (French), 31 pages (In Ex. S, attachment G); date unknown.

Greisheim, OMNIDATA Sistema de codificacion inteligente para etc. (Spanish), 31 pages (In Ex. S, atachment H); date unknown.

Greisheim, OMNIDATA (as above in Russian), 31 pages (In Ex. S, attachment I); date unknown.

Greisheim, OMNIDATA (as above in Japanese), 31 pages (In Ex. S, attachment J); date unknown.

Greisheim, Components S 16, Software for the preparation for paper tapes for control purposes, 8 pp. (In Ex. S, attachment K); date unknown.

Greisheim, Components SMD, An established EDP package for the plate processing industry, 13, pages (In Ex. S, attachment L); date unknown.

Greisheim, Description of Program, (English and German), 19 pages (In Ex. S, attachment M); date unknown.

Greisheim, Instruction Manual (English and German), 9 pages (In Ex. S, attachment N); date unknown.

Greisheim, Instruction Manual VESUV Automatic Nesting and Management (English and German), 80 pages (In Ex. S, attachment O); date unknown.

Greisheim, Manual Components S 16 English Commands, 143 pages (In Ex. S, attachment P); date unknown.

Greisheim, Instruction Manual for D16 Digitising Unit with English commands, 17 pages (In Ex. S, attachment Q); date unknown.

Greisheim, Benutzer Handbuch, Teilprogramm Phase 1/Geometric (German), 128 pages (In Ex. S, attachment R); date unknown.

Schiffko EDV System, Bauteile-Abwicklung Modul Rohrkrümmer, 21 pages (In Ex. S, attachment S); date unknown.

Schiffko EDV System, Programm-Übersicht Des Schiffko-Systems, 7 pages (In Ex. S, attachment T); date unknown.

Schiffko EDV System, Bauteile-Abwicklung CD C 6600/CD C175, 3 pages (In Ex. S, attachment U); date unknown.

Greisheim, Annual Report 1979 (In Ex. S, attachment V).

Greisheim, Annual Report 1980 (In Ex. S, attachment W).

Greisheim, Annual Report 1981 (In Ex. S, attachment X).

"Scheissen und Schneiden" (Welding and Cutting), Year of Publication 31 (1979), Nr. 4, pp. 169 & 175 (with English Translation) (In Ex. S, attachment Y).

Hannover-Nesse, Press Release, (1976) 20 pages (with English Translation) (In Ex. S, attachment Z).

Copy of cover, table of contents, and pp. 80-83 of "Welding Design & Fabrication" of Jun., 1979; particularly pp. 80-83 bearing article entitled Computerized Cutting Needs No Programmer (Reexam Ex. T, Adams Ex. A).

"Linde Division N/C Flame Cutter Technology-Precision Improved Nesting system User Guide, Mar., 1979" *PINS* (Reexam Ex. T, Adams Ex. C).

"Linde Division N/C Flame Cutter Technology-Adapt Macros for shape Cutting", Feb., 1980 (Adapt Manual) (Reexam Ex. T, Adams Ex. G).

Brochure of the McCarter Corporation entitled "Batch Type Asphalt Plants" (Reexam Ex. T, Adams Ex. I); date unknown.

Brochure of McCarter Corporation entitled "Baghouse Dust Collectors" (Reexam Ex. T, Adams Ex. J) date unknown.

"Introducing the Compuduct Autoplot" Letter and News Release, Nov. 1980 (Reexam Ex. D).

"Why U.K. Duct Firms Are Installing Computers," *Sheet Metal Industries*, Aug. 1980, pp. 690-692 (Reexam Ex. N).

Numerical Engineering-The Key to Success, British Numerical Control Society, Mar. 31, 1981.

The Planning and Production of Layout Drawings by Use of Computer Methods, Constantinou et al, Nov. 11-13, 1980.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–23 is confirmed.

New claims 24–41 are added and determined to be patentable.

24. *A method for automatically producing patterns for the sides of a three dimensional product which can be fabricated from sheet material, such as a ventilating duct fitting, said patterns being produced in response to the inputting of actual dimensional and pattern type data relating to said product, the method comprising the steps of:*

*storing, in digital form in memory means, configurations and dimensional requirements of basic product types from which all possible variations of the three dimensional product may be produced, each such basic product type having a specified geometry and at least one mathematical relationship relating selected basic dimensions of the product to the specified geometry, said basic dimensions comprising the sizes of the open sides of the product and at least one dimension determining the spatial relationship of the open sides;*

*entering input data into a computer operatively connected to said memory means, said input data including product type and said basic dimensions of said product, the entered dimensions corresponding to dimensional requirements, stored in said memory means, of the product type entered;*

*electronically deriving in said computer actual dimensional and pattern type data for each side of said product from the entered product type and dimensions of said product, the actual dimensional and pattern type data for each side of said product being developed from selected ones of said basic product types in response to said input dimensional and pattern type data;*

*storing in said memory means said actual dimensional and pattern type data; and*

*producing patterns for the sides of said product in response to said actual dimensional and pattern type data stored in said memory means.*

25. *The method recited in claim 24, further comprising the step of positioning said patterns for the sides of said product so as to reduce sheet material usage.*

26. *The method recited in claim 25, wherein the step of positioning said patterns for the sides of said product comprises the steps of:*

*positioning each developed pattern in related positions with other developed patterns to generate a series of positioning without operator interaction and decision-making; and*

*determining which of said positionings yields a minimum surface area so as to provide for optimum material usage without operator interaction and decision-making.*

27. *The method recited in claim 24, wherein said step of producing comprises cutting said patterns from a sheet of material.*

28. *Apparatus for automatically producing patterns for the sides of a three dimensional product which can be fabricated from sheet material, such as a ventilating duct fitting, said patterns being produced in response to the inputting of actual dimensional and pattern type data relating to said product, the apparatus comprising:*

*memory means for storing in digital form configurations and dimensional requirements of basic product types from which all possible variations of the three dimensional product may be produced, each such product type having a specified geometry and at least one mathematical relationship relating selected basic dimensions of the product to the specified geometry, said basic dimensions comprising the size of the open sides of the product and at least one dimension determining the spatial relationship of the open sides;*

*a computer operatively linked to said memory means;*

*means for entering into said computer input data including product type and dimensions of said product, the entered dimensions corresponding to dimensional requirements, stored in said memory means, of the product type entered;*

*means including said computer for electronically deriving actual dimensional and pattern type data for each side of said product from the entered product type and dimensions of said product, the actual dimensional and pattern type data for each side of said product being developed from selected ones of said basic product types in response to said input dimensional and pattern type data;*

*storage means for at least temporarily memorizing said actual dimensional and pattern type data; and*

*means for producing patterns for the sides of said product in response to said actual dimensional and pattern type data stored in said memory means.*

29. *The apparatus recited in claim 28, further comprising means for positioning said patterns for the sides of said product so as to reduce sheet material usage.*

30. *The apparatus recited in claim 29, wherein said means for positioning said patterns for the sides of said product comprises:*

*means for positioning each developed pattern in related positions with other developed patterns to generate a series of positionings without operator interaction and decision-making; and*

*means for determining which of said positionings yields a minimum surface area so as to provide for optimum material usage without operator interaction and decision-making.*

31. *The apparatus recited in claim 28 wherein said means for producing comprises means for cutting said patterns from a sheet of material.*

32. *A method for automatically producing customized patterns for the closed sides of a three dimensional product which can be fabricated from sheet material, such as a ventilating duct fitting, said customized patterns being produced in response to the inputting of actual dimensional and pattern type data relating to said product, the method comprising the steps of:*

*storing, in digital form in memory means, configurations and dimensional requirements of two dimensional basic product types from which all possible variations* of the three-dimensional product may be produced, selected ones of said basic product types being used to generate the closed sides of the product;

entering input data into a computer operatively connected to said memory means, said input data including product type and basic dimensions of said product, the entered dimensions corresponding to dimensional requirements, stored in said memory means, of the product type entered;

electronically deriving in said computer, using said basic product types, actual dimensional and pattern type data for each side of said product from the entered product type and dimensions of said product;

storing in said memory means said actual dimensional and pattern type data;

positioning patterns defined by said actual dimensional and pattern type data so as to reduce sheet material usage; and producing patterns for the closed sides of said product in response to said actual dimensional and pattern type data stored in said memory means.

33. Apparatus for automatically producing customized patterns for the closed sides of a three dimensional product which can be fabricated from sheet material, such as a ventilating duct fitting, said customized patterns being produced in response to the inputting of actual dimensional and pattern type data relating to said product, the apparatus comprising:

memory means for storing in digital form configurations and dimensional requirements of two dimensional basic product types from which all possible variations of the three dimensional product may be produced, selected ones of said basic product types being used to generate the closed sides of the product;

a computer operatively linked to said memory means;

means for entering into said computer input data including product type and basic dimensions of said product, the entered dimensions corresponding to dimensional requirements, stored in said memory means, of the product type entered;

means including said computer for electronically deriving, using said basic product types, actual dimensional and pattern type data for each side of said product from the entered product type and dimensions of said product;

storage means for at least temporarily memorizing said actual dimensional and pattern type data;

means for positioning patterns defined by said actual dimensional and pattern type data so as to reduce sheet material usage; and means for producing patterns for the closed sides of said product in response to said actual dimensional and pattern type data stored in said memory means.

34. A method for automatically producing customized patterns for the closed sides of a three dimensional product which can be fabricated from sheet material, such as a ventilating duct fitting, said customized patterns being produced in response to the inputting of actual dimensional and pattern type data relating to said product, the method comprising the steps of:

designing, at least partially automatically, conduit sections of a heating and ventilating network including duct fittings;

automatically producing an output containing fitting fabrication information used for making the customized patterns of duct fittings;

storing, in digital form in memory means, configurations and dimensional requirements of two dimensional basic product types from which all possible variations of three dimensional duct fittings may be produced, selected ones of said basic product types being used to generate the closed sides of a duct fitting whose customized patterns are to be produced;

entering input data from said output into a computer operatively connected to said memory means, said input data comprising said fitting fabrication information including duct fitting type and basic dimensions of the duct fitting whose customized patterns are to be produced, the entered dimensions corresponding to dimensional requirements, stored in said memory means, of the duct fitting type entered;

electronically deriving in said computer, using said basic product types, actual dimensional and pattern type data for each side of said duct fitting whose customized patterns are to be produced from the entered duct fitting type and dimensions of said fitting whose customized patterns are to be produced;

storing in said memory means said actual dimensional and pattern type data; and producing patterns for the closed sides of said duct fitting whose customized patterns are to be produced in response to said actual dimensional and pattern type data stored in said memory means.

35. The method recited in claim 34, further comprising the step of automatically producing a drawing of the network.

36. Apparatus for automatically producing customized patterns for the closed sides of a three dimensional product which can be fabricated from sheet material, such as a ventilating duct fitting, said customized patterns being produced in response to the inputting of actual dimensional and pattern type data relating to said product, the apparatus comprising:

means for designing, at least partially automatically, conduit sections of a heating and ventilating network including duct fittings;

means for automatically producing an output containing fitting fabrication information used for making the customized patterns of duct fittings;

memory means for storing in digital form configurations and dimensional requirements of two dimensional basic product types from which all possible variations of three-dimensional duct fittings may be produced, selected ones of said basic product types being used to generate the closed sides of a duct fitting whose customized patterns are to be produced;

a computer operatively linked to said memory means;

means for entering into said computer input data from said output comprising said fitting fabrication information including duct fitting type and basic dimensions of the duct fitting to be produced, the entered dimensions corresponding to dimensional requirements, stored in said memory means, of the duct fitting type entered;

means including said computer for electronically deriving, using said basic product types, actual dimensional and pattern type data for each side of said fitting whose customized patterns are to be produced from the entered duct fitting type and dimensions of said fitting whose customized patterns are to be produced;

storage means for at least temporarily memorizing said actual dimensional and pattern type data; and means for producing patterns for the closed sides of said fitting whose customized patterns are to be produced in response to said actual dimensional and pattern type data stored in said memory means.

37. The apparatus recited in claim 36, further comprising means for automatically producing a drawing of the network.

38. A method for automatically producing customized patterns for the closed sides of a three dimensional product which can be fabricated from sheet material, such as a ventilating duct fitting, said customized patterns being produced in response to the inputting of actual dimensional and pattern type data relating to said product, the method comprising the steps of:
- designing, at least partially automatically, conduit sections of a heating and ventilating network including duct fittings;
- said step of designing comprising the steps of:
- storing information representative of basic conduct section types of a heating and ventilating network;
- entering input data comprising a conduit section type to be designed and dimensions of the conduit section to be designed; and
- generating a pattern of said conduit section of the network to be designed on a display from a selected one of said basic conduit section types and said dimensions; and further comprising
- automatically producing an output containing fitting fabrication information used for making the customized patterns of duct fittings;
- storing, in digital form in memory means, configurations and dimensional requirements of two dimensional basic product types from which all possible variations of three dimensional duct fittings may be produced, selected ones of said basic product types being used to generate the closed sides of a duct fitting whose customized patterns are to be produced;
- entering input data from said output into a computer operatively connected to said memory means, said input data comprising said fitting fabrication information including duct fitting type and basic dimensions of the duct fitting whose customized patterns are to be produced, the entered dimensions corresponding to dimensional requirements, stored in said memory means, of the duct fitting type entered;
- electronically deriving in said computer, using said basic product types, actual dimensional and pattern type data for each side of said duct fitting whose customized patterns are to be produced from the entered duct fitting type and dimensions of said fitting whose customized patterns are to be produced;
- storing in said memory means said actual dimensional and pattern type data; and
- producing patterns for the closed sides of said duct fitting whose customized patterns are to be produced in response to said actual dimensional and pattern type data stored in said memory means.

39. The method recited in claim 38 further comprising automatically producing a drawing of the network.

40. Apparatus for automatically producing customized patterns for the closed sides of a three dimensional product which can be fabricated from sheet material, such as a ventilating duct fitting, said customized patterns being produced in response to the inputting of actual dimensional and pattern type data relating to said product, the apparatus comprising:
- means for designing, at least partially automatically, conduit sections of a heating and ventilating network including duct fittings;
- said means for designing comprising:
- means for storing information representative of basic conduit section types of a heating and ventilating network;
- means for entering input data comprising a conduit section type to be designed and dimensions of the conduit section to be designed; and
- means for generating a pattern of said conduit section of the network to be designed on a display from a selected one of said basic conduit section types and said dimensions; and further comprising
- means for automatically producing an output containing fitting fabrication information used for making the customized patterns of duct fittings;
- memory means for storing in digital form configurations and dimensional requirements of two dimensional basic product types from which all possible variations of three-dimensional duct fittings may be produced, selected ones of said basic product types being used to generate the closed sides of a duct fitting whose customized patterns are to be produced;
- a computer operatively linked to said memory means;
- means for entering into said computer input data from said output comprising said fitting fabrication information including duct fitting type and basic dimensions of the duct fitting to be produced, the entered dimensions corresponding to dimensional requirements, stored in said memory means, of the duct fitting type entered;
- means including said computer for electronically deriving, using said basic product types, actual dimensional and pattern type data for each side of said fitting whose customized patterns are to be produced from the entered duct fitting type and dimensions of said fitting whose customized patterns are to be produced;
- storage means for at least temporarily memorizing said actual dimensional and pattern type data; and
- means for producing patterns for the closed sides of said fitting whose customized patterns are to be produced in response to said actual dimensional and pattern type data stored in said memory means.

41. The apparatus recited in claim 40, further comprising means for automatically producing a drawing of the network.

* * * * *